United States Patent
Yin et al.

(10) Patent No.: US 10,841,751 B2
(45) Date of Patent: Nov. 17, 2020

(54) GROUP MULTICAST METHOD, GROUP CREATION METHOD, AND MOBILE NETWORK PLATFORM

(71) Applicant: Huawei Technologies Co., Ltd., Shenzhen (CN)

(72) Inventors: Jiaxin Yin, Nanjing (CN); Sichen Wang, Shenzhen (CN); Ying Gao, Nanjing (CN); Jiaming Wu, Shenzhen (CN); Yaoye Zhang, Nanjing (CN); Yongjing Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 16/010,047

(22) Filed: Jun. 15, 2018

(65) Prior Publication Data
US 2018/0310141 A1    Oct. 25, 2018

Related U.S. Application Data

(63) Continuation of application No. PCT/CM2016/109746, filed on Dec. 13, 2016.

(30) Foreign Application Priority Data

Dec. 15, 2015  (CN) .......................... 2015 1 0934059

(51) Int. Cl.
*G08C 15/06* (2006.01)
*H04W 4/08* (2009.01)
(Continued)

(52) U.S. Cl.
CPC .............. *H04W 4/08* (2013.01); *H04L 12/189* (2013.01); *H04L 29/06* (2013.01); *H04W 4/70* (2018.02); *H04W 72/04* (2013.01); *H04W 4/06* (2013.01)

(58) Field of Classification Search
None
See application file for complete search history.

(56) References Cited

U.S. PATENT DOCUMENTS

| 2003/0135594 A1 | 7/2003 | Xu et al. |
| 2013/0053087 A1* | 2/2013 | Li .......................... H04W 4/06 455/518 |

(Continued)

FOREIGN PATENT DOCUMENTS

| CN | 101873302 A | 10/2010 |
| CN | 102130773 A | 7/2011 |

(Continued)

OTHER PUBLICATIONS

Machine Translation and Abstract of Chinese Publication No. CN102130773, Jul. 20, 2011, 27 pages.

(Continued)

*Primary Examiner* — Sithu Ko
(74) *Attorney, Agent, or Firm* — Conley Rose, P.C.

(57) ABSTRACT

A mobile network platform creates a device group according to a member device supporting a mobile network multicast communication manner in a Machine-to-Machine Communications (M2M) group, generates an identifier of an external group corresponding to the device group, and requests a service capability exposure function (SCEF) to create the external group according to the identifier of the external group and an external device identifier of the member device supporting the mobile network multicast communication manner. When receiving an access request for the M2M group, the mobile network platform obtains the device group in the M2M group, learns of the corresponding external group, and then requests the SCEF to access the member device in the external group in a multicast communication manner. Hence, an amount of information generated due to (Continued)

interaction between an M2M platform and an M2M device is reduced, while reducing resource overheads.

20 Claims, 11 Drawing Sheets

(51) Int. Cl.
*H04W 4/70* (2018.01)
*H04L 29/06* (2006.01)
*H04L 12/18* (2006.01)
*H04W 72/04* (2009.01)
*H04W 4/06* (2009.01)

(56) References Cited

U.S. PATENT DOCUMENTS

| | | | |
|---|---|---|---|
| 2013/0258953 A1 | 10/2013 | Huang et al. | |
| 2013/0272186 A1* | 10/2013 | Mohanty | H04L 5/0053 370/312 |
| 2013/0339438 A1 | 12/2013 | Cherian et al. | |
| 2013/0346504 A1* | 12/2013 | Huang | H04L 12/185 709/204 |
| 2014/0369251 A1* | 12/2014 | Zhang | H04W 4/08 370/312 |
| 2015/0119083 A1* | 4/2015 | Chandramouli | H04W 4/029 455/456.3 |
| 2015/0223028 A1* | 8/2015 | Wang | H04W 4/70 370/312 |
| 2015/0245162 A1 | 8/2015 | Chao | |
| 2015/0289117 A1* | 10/2015 | Huang | H04L 67/104 455/466 |
| 2016/0007138 A1* | 1/2016 | Palanisamy | H04L 67/1044 455/41.2 |
| 2016/0007316 A1* | 1/2016 | Vaidya | H04W 64/003 370/312 |
| 2016/0100362 A1* | 4/2016 | Palanisamy | H04W 52/0212 370/311 |
| 2018/0092133 A1* | 3/2018 | Starsinic | H04L 67/1046 |

FOREIGN PATENT DOCUMENTS

| | | |
|---|---|---|
| CN | 103200209 A | 7/2013 |
| CN | 104468337 A | 3/2015 |
| JP | 2015506139 A | 2/2015 |
| JP | 2015511417 A | 4/2015 |
| JP | 2015534387 A | 11/2015 |
| KR | 20140095571 A | 8/2014 |
| KR | 20150060927 A | 6/2015 |

OTHER PUBLICATIONS

Foreign Communication From a Counterpart Application, Chinese Application No. 201510934059.2, Chinese Office Action dated Jul. 3, 2019, 8 pages.
Machine Translation and Abstract of Japanese Publication No. JP2015511417, Apr. 16, 2015, 78 pages.
Foreign Communication From a Counterpart Application, Japanese Application No. 2018-530860, Japanese Office Action dated Jul. 23, 2019, 2 pages.
Foreign Communication From a Counterpart Application, Japanese Application No. 2018-530860, English Translation of Japanese Office Action dated Jul. 23, 2019, 3 pages.
Machine Translation and Abstract of Chinese Publication No. CN101873302, Oct. 27, 2010, 25 pages.
Machine Translation and Abstract of Chinese Publication No. CN104468337, Mar. 25, 2015, 26 pages.
"Functional Architecture," ONEM2M Technical Specification, TS-0001-V2.5.0, Nov. 29, 2015, 376 pages.
Foreign Communication From a Counterpart Application, PCT Application No. PCT/CN2016/109746, English Translation of International Search Report dated Feb. 8, 2017, 2 pages.
Foreign Communication From a Counterpart Application, PCT Application No. PCT/CN2016/109746, English Translation of Written Opinion dated Feb. 8, 2017, 7 pages.
Machine Translation and Abstract of Korean Publication No. KR20140095571, Aug. 1, 2014, 74 pages.
Machine Translation and Abstract of Chinese Publication No. CN20150060927, Jun. 3, 2015, 25 pages.
Foreign Communication From a Counterpart Application, Japanese Application No. 10-2018-7019922, Japanese Office Action dated Aug. 9, 2019, 12 pages.
Foreign Communication From a Counterpart Application, Japanese Application No. 10-2018-7019922, English Translation of Japanese Office Action dated Aug. 22, 2019, 11 pages.
Foreign Communication From a Counterpart Application, European Application No. 16874817.6, Extended European Search Report dated Aug. 14, 2018, 7 pages.

* cited by examiner

GROUP MULTICAST METHOD, GROUP CREATION METHOD, AND MOBILE NETWORK PLATFORM

CROSS-REFERENCE TO RELATED APPLICATIONS

This application is a continuation of International Patent Application No. PCT/CN2016/109746 filed on Dec. 13, 2016, which claims priority to Chinese Patent Application No. 201510934059.2 filed on Dec. 15, 2015, both of which are hereby incorporated by reference in their entireties.

TECHNICAL FIELD

The present disclosure relates to the field of wireless communications technologies, and in particular, to a group multicast method, a group creation method, and a mobile network platform.

BACKGROUND

Machine-to-Machine Communications (M2M) are widely applied to the Internet of Things field, such as intelligent transportation, agricultural irrigation, smart household, power grids, and meter reading to implement combination of industrialization and informatization in various industries.

As a specification relatively commonly applied in current M2M technologies, ONEM2M defines a common service entity (CSE), an M2M platform, an M2M gateway, an M2M device, and a protocol of interaction therebetween. An application server may be connected to the M2M platform and the M2M gateway using the CSE, and further, a service layer group function of the M2M device is triggered using an underlying network in order to send a command to and collect responses from multiple M2M devices. For example, a meter reading application server of an electrical grid company may request and collect, using the service layer group function, electric energy data from a same group of electricity meters that are located at various places in a city.

An existing M2M-technology-based group multicast technology is implemented using a User Datagram Protocol (UDP) network. The UDP is used to provide support for a network application that requires data transmission between a server and a device. A process of performing group multicast using the UDP network is as follows. The application server sends a UDP group create request to the M2M platform, the M2M platform sends a UDP group joining notification to multiple specified M2M devices such that the specified M2M devices that receive the joining notification separately join a UDP group, finally, the M2M platform accesses the specified M2M devices in the UDP group in a group multicast communication manner according to a group access request sent by the application server.

That is, in other approaches, each M2M device that receives the joining notification needs to actively initiate a group joining operation. In this case, if there is a relatively large quantity of specified M2M devices, a large amount of information is generated in a process of interaction between the M2M platform and the M2M devices, resulting in a very large quantity of resource overheads. In addition, a process in which the M2M platform waits for the M2M devices to join the group is also time consuming, reducing group multicast efficiency.

SUMMARY

Embodiments of the present disclosure provide a group multicast method, a group creation method, and a mobile network platform such that a member device supporting a mobile network multicast communication manner no longer needs to actively join an M2M multicast group during multicast, but instead, receives a multicast access command in a multicast communication manner. This reduces an amount of information that is generated between the mobile network platform and the member device because the member device needs to actively join the multicast group by means of requesting, reducing resource overheads.

According to a first aspect, the present disclosure provides a group multicast method. A mobile network platform stores a device group identifier of a member device supporting a mobile network multicast communication manner in a group, and an identifier that is of an external group corresponding to the device group and that is stored in a mobile network server. When receiving a group access request from an application server, the mobile network platform obtains a device group that includes the member device supporting the mobile network multicast communication manner, and then determines the identifier that is of the external group corresponding to the device group and that is stored in the mobile network server. Finally, the mobile network platform sends an access command to the external group using the mobile network server such that the mobile network server may send the access command to a member device in the external group in the mobile network multicast communication manner. Each member device in the external group supports mobile network multicast. Therefore, the member device in the external group may receive the access command that is multicast in the mobile network multicast communication manner, and each member device does not need to join a multicast group by actively sending a request. This may reduce an amount of information generated between the mobile network platform and the member device, reducing overheads.

According to a second aspect, the present disclosure provides a group multicast method. A service layer apparatus receives a group access request and learns of a device group identifier in a group. Then, the service layer apparatus sends an access request for a device group to a mobile network platform. After receiving the access request for the device group, the mobile network platform determines an identifier of an external group corresponding to the device group, sends a mobile network multicast request to a mobile network server, and performs related procedures implemented by mobile network platforms in FIG. 6A and FIG. 6B, and FIG. 7A and FIG. 7B. In this device, the service layer apparatus and the mobile network platform are separated in design. The service layer apparatus is responsible for interacting with an application server that sends the group access request, determining the device group identifier, and sending the access request for the device group to the mobile network platform. This may increase network layout flexibility, reduce pressure of interaction between the mobile network platform and the application server, and also reduce an amount of information generated between the mobile network platform and a member device, reducing overheads.

In a possible design with reference to the foregoing two aspects, the mobile network platform may allocate a response address to the member device in the device group such that the member device in the device group obtains the response address and sends response information for request content to the mobile network platform. In this way, the mobile network platform may clearly determine whether the member device successfully receives the access request, and provide a condition for handling different statuses.

In a possible design with reference to the foregoing two aspects, the member device supporting mobile network multicast may support different types of multicast communication manners. The device group stored in the mobile network platform may include device sub-groups that include different member devices. Therefore, the mobile network platform searches for a device sub-group of the device group according to the device group identifier, and specifies, in a multicast request, an identifier of a device sub-group that receives the access command such that the mobile network server may perform multicast only on a member device in a group corresponding to the identifier of the device sub-group, thereby improving multicast efficiency and a success rate.

In a possible design, after searching for the device sub-group of the device group according to the device group identifier, the mobile network platform may determine a multicast type of the device sub-group, and may further allocate the response address to a member device in the device sub-group according to the multicast type of the device sub-group such that the mobile network platform may perform different management on different device sub-groups, thereby improving management precision and accuracy.

In a possible design, the mobile network platform creates a request resource for a device sub-group whose multicast type is a cell broadcast service (CBS), stores the request content in the request resource, and allocates a request address to the request resource. A member device whose multicast type is a CBS may obtain the request content from the request resource using the request address. There is a limited amount of data generated when the member device whose multicast type is a CBS receives a message in a multicast communication manner. Therefore, creating the request resource by the mobile network platform helps improve a multicast process such that the member device whose multicast type is a CBS also can participate in a multicast interaction process.

In a possible design, after receiving the response information that is sent for the request content by the member device in the device group to the response address, the mobile network platform may create, according to a member device that has not received returned response information, a trigger device group whose multicast type is triggered multicast, and finally instruct the mobile network server to create a trigger external group corresponding to the trigger device group such that a multicast type of the member device can be changed in a timely manner, thereby ensuring a multicast success rate.

According to a third aspect, the present disclosure provides a group multicast method. A member device receives an access command that is sent by a mobile network server in a mobile network multicast communication manner, and obtains, from the access command, request content and a response address that is allocated by a mobile network platform. Then, the member device sends response information for the request content to the mobile network platform according to the response address. Therefore, each member device does not need to actively send a request to join a multicast group. This may reduce an amount of information generated between the mobile network platform and the member device, reducing overheads.

According to a fourth aspect, the present disclosure provides a group creation method. After receiving a group create request from an application server, a mobile network platform obtains a group identifier and a device identifier of a member device in a group according to the group create request, determines, using the device identifier of the member device, a member device supporting a mobile network multicast communication manner in the group, and creates a group indicated by the group identifier and a device group that includes the member device supporting the mobile network multicast communication manner, and finally, generates an identifier of an external group that corresponds to the device group and that is stored in a mobile network server in order to request the mobile network server to create the external group corresponding to the device group. Each member device in the external group supports mobile network multicast. Therefore, after the mobile network server creates the external group, the mobile network platform can send an access request for the external group to the mobile network server, and a member device in the external group may receive an access command that is multicast in the mobile network multicast communication manner. Each member device does not need to actively send a request to join a multicast group. This may reduce an amount of information generated between the mobile network platform and the member device, reducing overheads.

According to a fifth aspect, the present disclosure provides a group creation method. A service layer apparatus receives a group create request sent by an application server, obtains a group identifier and a device identifier of a member device in a group using the group create request, determines, according to the device identifier of the member device, a member device supporting a mobile network multicast communication manner in the group and performs a related procedure implemented by a mobile network platform in FIG. 8A and FIG. 8B, and then requests the mobile network platform to create a device group including an identifier of the member device supporting the mobile network multicast communication manner. In this device, the service layer apparatus and the mobile network platform are separated in design. The service layer apparatus is responsible for interacting with the application server that sends the group create request, determining the member device supporting the mobile network multicast communication manner, and sending a create request for the device group to the mobile network platform. This may increase network layout flexibility, reduce pressure of interaction between the mobile network platform and the application server, and also reduce an amount of information generated between the mobile network platform and a member device, reducing overheads.

In the foregoing two possible designs, the service layer apparatus obtains registration information of the member device from the mobile network platform according to the device identifier of the member device, and determines that a member device whose registration information includes an external device identifier is the member device supporting the mobile network multicast communication manner. The service layer apparatus can determine, using the registration information of the member device that is stored in the mobile network platform, the member device supporting the mobile network multicast communication manner in order to provide a condition for handling different statuses.

In a possible design, the member device supporting mobile network multicast may support different types of multicast communication manners. The mobile network platform obtains historical location information of the member device and/or information indicating that the member device supports a Multimedia Broadcast Multicast Service (MBMS) to determine a multicast type of the member device, and creates a device sub-group of the device group according to the multicast type of the member device. In this way, a mobile network server may perform multicast only on a member device in a group corresponding to a device sub-group identifier during multicast, thereby improving multicast efficiency and a success rate.

In a possible design, the mobile network platform may determine that the multicast type of the member device is an MBMS according to the obtained information indicating that the member device supports the MBMS, or determine whether the multicast type of the member device is a CBS or a packet data network (PDN) according to whether base stations accessed within a preset time range by the member device are a same base station. This restricts a specific manner of determining the multicast type, makes it convenient to implement different multicast communication manners for different multicast types, implements diversified multicast communication manners, and improves a multicast success rate.

According to a sixth aspect, the present disclosure provides a mobile network platform. The mobile network platform has a function of implementing behavior of the mobile network platform in the foregoing method designs. The function may be implemented using hardware or using hardware executing corresponding software. The hardware or the software includes one or more modules corresponding to the foregoing function. The module may be software and/or hardware. The mobile network platform includes a receiving unit, a search unit, a determining unit, and a sending unit, which are used to perform related steps of the group multicast method provided in the first aspect.

The receiving unit is configured to receive an access request for a M2M group, where the access request carries an M2M group identifier and request content. The search unit is configured to search for an identifier of a device group according to the M2M group identifier received by the receiving unit, where a member device included in the device group is a member device supporting a mobile network multicast communication manner in a group indicated by the M2M group identifier. The determining unit is configured to determine an identifier of an external group corresponding to the device group found by the search unit, where the external group is stored in a mobile network server, and a member device in the external group is the member device in the device group. The sending unit is configured to send a mobile network multicast request to the mobile network server, where the mobile network multicast request carries the identifier of the external group and the request content, the mobile network multicast request is used to instruct to send an access command to the member device in the external group in the mobile network multicast communication manner, and the access command carries the request content.

According to a seventh aspect, the present disclosure provides a mobile network platform. The mobile network platform includes a receiving unit, a first determining unit, a creation unit, a generation unit, and a sending unit, which are used to perform related steps of the group creation method provided in the fourth aspect.

The receiving unit is configured to receive a group create request, where the group create request carries a M2M group identifier and a device identifier of a member device in a to-be-created M2M group. The first determining unit is configured to determine, according to the device identifier of the member device that is received by the receiving unit, a member device supporting a mobile network multicast communication manner. The creation unit is configured to create, according to the group create request received by the receiving unit, an M2M group indicated by the M2M group identifier, where the M2M group includes a device group identifier, and the device group identifier includes information indicating that mobile network multicast is supported. The creation unit is further configured to create a device group for the member device that supports the mobile network multicast communication manner and that is determined by the determining unit. The generation unit is configured to generate, according to the information indicating that mobile network multicast is supported, an external group identifier of a to-be-created external group corresponding to the device group. The sending unit is configured to send an external group create request to a mobile network server, where the external group create request includes an external group identifier and an external device identifier of the member device supporting the mobile network multicast communication manner, and the external group create request is used to instruct to create an external group whose identifier is the external group identifier and that includes the external device identifier of the member device supporting the mobile network multicast communication manner.

In a possible design, a structure of the mobile network platform includes a receiver, a transmitter, and a processor. The processor is configured to allow the mobile network platform to perform a corresponding function in the foregoing method. The transmitter is configured to support communication between the mobile network platform and a mobile network server. The mobile network platform may further include a memory. The memory is coupled to the processor, and is configured to store a necessary program instruction and data of the mobile network platform. The mobile network platform may further include a communications interface, used by the mobile network platform to communicate with another device or a communications network.

In a possible design, the processor is located in the mobile network platform. In one aspect, code stored in the memory may execute the group multicast method provided in the present disclosure, for example, obtain a device group including a member device supporting a mobile network multicast communication manner and then determine an identifier of an external group that corresponds to the device group and that is stored in the mobile network server. In another aspect, code stored in the memory may further execute the group creation method provided in the present disclosure, for example, obtain a group identifier and a device identifier of a member device in a group according to a group create request, determine, using the device identifier of the member device, a member device supporting a mobile network multicast communication manner in the group, and create a group indicated by the group identifier and a device group that includes the member device supporting the mobile network multicast communication manner, and finally, generate an identifier of an external group that corresponds to the device group and that is stored in the mobile network server.

In a possible design, a structure of a service layer apparatus includes a receiver, a transmitter, and a processor. The processor is configured to allow the service layer apparatus to perform a corresponding function in the foregoing method. The transmitter is configured to support communication between the service layer apparatus and a mobile network platform. The service layer apparatus may further include a memory. The memory is coupled to the processor, and is configured to store a necessary program instruction and data of the mobile network platform. The service layer apparatus may further include a communications interface, used by the service layer apparatus to communicate with another device or a communications network.

In a possible design, the processor is located in the service layer apparatus. In one aspect, code stored in the memory may execute the group multicast method provided in the present disclosure, for example, learn a device group identifier in a group, and then send an access request for a device group to the mobile network platform. After receiving the access request for the device group, the mobile network platform determines an identifier of an external group corresponding to the device group, sends a mobile network multicast request to the mobile network server, and performs related procedures implemented by mobile network platforms in FIG. 6A and FIG. 6B, and FIG. 7A and FIG. 7B. In another aspect, code stored in the memory may further execute the group creation method provided in the present disclosure, for example, obtain a group identifier and a device identifier of a member device in a group using a group create request, determine, according to the device identifier of the member device, a member device supporting a mobile network multicast communication manner in the group, and perform a related procedure implemented by a mobile network platform in FIG. 8A and FIG. 8B, and then request the mobile network platform to create a device group including an identifier of the member device supporting the mobile network multicast communication manner.

In a possible design, a structure of a member device includes a receiver, a transmitter, and a processor. The processor is configured to allow the member device to perform a corresponding function in the foregoing method. The transmitter is configured to support communication between the member device and the mobile network platform and between the member device and the mobile network server. The member device may further include a memory. The memory is coupled to the processor, and is configured to store a necessary program instruction and data of the member device. The member device may further include a communications interface, used by the member device to communicate with another device or a communications network.

In a possible design, the processor is located in the member device. Code stored in the memory may execute the group multicast method provided in the present disclosure, for example, obtain, from an access command sent by the mobile network server, request content and a response address that is allocated by the mobile network platform. Then, the member device sends response information for the request content to the mobile network platform according to the response address.

According to an eighth aspect, the present disclosure provides a computer storage medium configured to store a computer software instruction used by the foregoing mobile network platform, where the computer software instruction is used to execute a program designed in the foregoing aspects.

According to a ninth aspect, the present disclosure provides a computer storage medium configured to store a computer software instruction used by the foregoing service layer apparatus, where the computer software instruction is used to execute a program designed in the foregoing aspects.

According to a tenth aspect, the present disclosure provides a computer storage medium configured to store a computer software instruction used by the foregoing member device, where the computer software instruction is used to execute a program designed in the foregoing aspects.

In comparison with the other approaches, in the solutions provided in the present disclosure, network data transmission modes such as multicast, broadcast, and multicast can be supported to reduce an amount of information generated between a mobile network platform and a member device, reduce resource overheads, and implement centralized scheduling by the mobile network platform.

These aspects or other aspects of the present disclosure become clearer and more comprehensible in the following descriptions of embodiments.

BRIEF DESCRIPTION OF DRAWINGS

To describe the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

To help understand the present disclosure, the following first describes technical content, related to the present disclosure, in ONEM2M and 3rd Generation Partnership Project (3GPP).

(1) ONEM2M Architecture and Service Layer Group Function

Figure 1A:
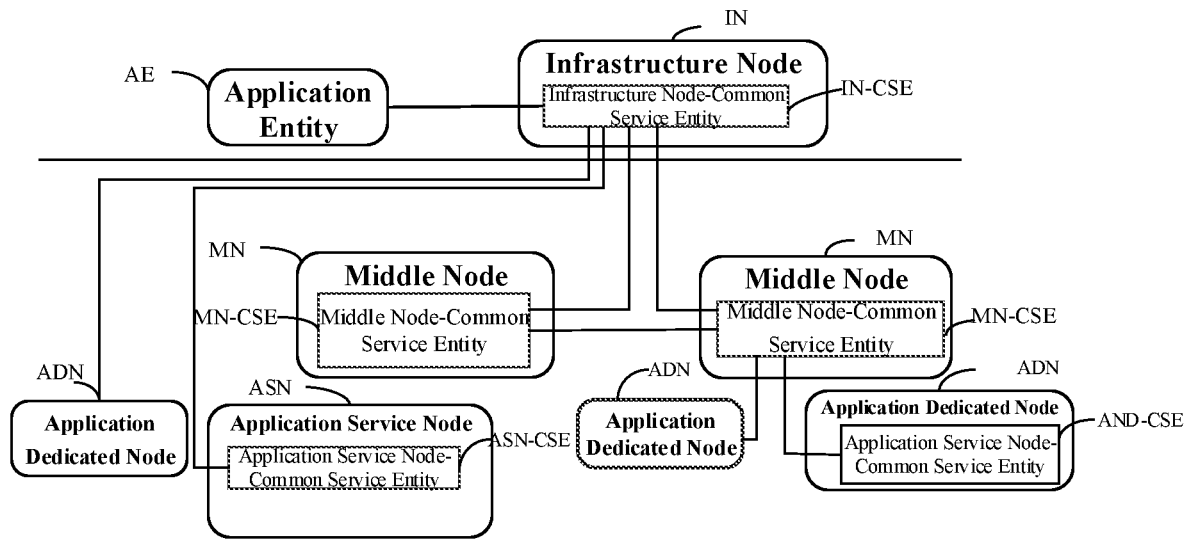
FIG. 1A is a schematic diagram of a ONEM2M architecture according to the present disclosure.
Figure 1B:
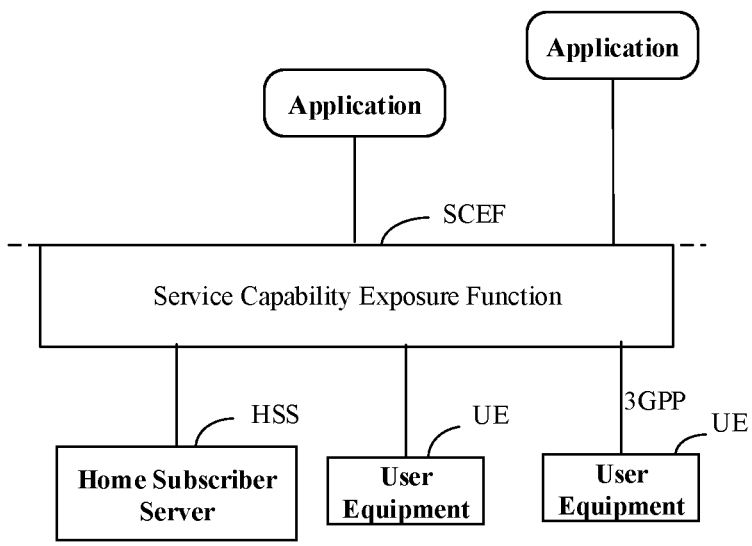
FIG. 1B is a schematic diagram of another ONEM2M architecture according to the present disclosure.

ONEM2M defines a CSE, an M2M platform, an M2M gateway, an M2M device, and a protocol of interaction therebetween. The ONEM2M architecture is shown in FIG. 1A and FIG. 1B. In FIG. 1A, the M2M platform is an infrastructure node (IN), the M2M gateway is a middle node (MN), and M2M devices are an application service node (ASN) and an application dedicated node (ADN). In addition, the CSE is a common capability component defined by ONEM2M, and can implement a common capability. The CSE allows, using an Mca reference point, an application entity (AE) to access a common capability exposed by the CSE, and implements communication between CSEs using an Mcc reference point, and implements invoking of an underlying network capability using an Mcn reference point.

Further, the common capability of the CSE includes a service layer group function. The AE may send a command to and collect responses from multiple M2M devices in a group manner using the service group function of ONEM2M. For example, a meter reading application server of an electrical grid company may request and collect, using the service layer group function, electric energy data from a same group of electricity meters that are located at various places in a city. In specific implementation, a CSE in a group device stores a service layer group resource, and a CSE in a member device stores a service layer member resource. When the AE sends a group access request, the CSE in the group device may determine, according to the service layer group resource, a member resource to which the request is to be distributed, and may determine an address of each member device according to the service layer member resource, further distribute the request to the member devices one by one, collect a feedback from each member device, and return aggregated feedbacks to the AE.

(2) 3GPP Architecture and External Group Function

A 3GPP network includes a core network and an access network. User Equipments (UEs) are connected to each other using the access network and the core network. A Subscriber Identity Module (SIM) card is generally built in UE, and is used to store information about subscription with a mobile network operator. A subscribed device may access the 3GPP network, thereby implementing functions such as access of the device to a network, a call, a short message services (SMS), and a location. Correspondingly, the operator stores the subscription information of the UE in an home subscriber server (HSS), and uses an international mobile subscriber identity (IMSI) as a subscription identifier (also referred to as ID) of the UE in a mobile network operator (MNO). The IMSI may uniquely identify the UE.

Further, a 3GPP protocol defines a 3GPP group function (Group Enhancement). Further, information about an external group is stored in the HSS, and includes a group identifier (group ID) and an IMSI. The group ID is a unique identifier of the external group on a network, and the external group uses the IMSI to identify all member UEs in the group. In the other approaches, a mobile network platform cannot directly access the HSS, and can access the HSS only using an open 3GPP network capability exposed by a mobile network server (for example, a service capability exposure function (SCEF)), and invoke an external group function provided by the 3GPP network to implement multicast to multiple UEs in FIG. 1B in a group manner. The multiple UEs in FIG. 1B are UEs having a 3GPP communications function.

In an existing ONEM2M architecture, because a CSE (for example, an IN-CSE) in a group device needs to distribute a request to each member device, a process of interaction between the group device and member devices is extended, and resource overheads increase. Therefore, an embodiment of the present disclosure provides a solution in which ONEM2M is combined with an external network (such as a 3GPP network or a broadband forum (BBF) network). An external group is established using a mobile network server, and a multicast function of the external group is used to reduce an amount of information exchanged between a group device and a member, reducing resource overheads.

Further, for example, a network defined in ONEM2M is combined with a 3GPP network. A CSE implementing a group function may be used as a service capability server (SCS) or an application server of a mobile network. A group multicast function provided by the mobile network is invoked using a mobile network server (for example, an SCEF) such that a CSE of a group device may communicate with at least one M2M device using the mobile network. The M2M device is UE, and the M2M device performs communication using a mobile network provided by a wireless network operator MNO.

The mobile network platform in the present disclosure creates a device group for a member device supporting a mobile network multicast communication manner in a group, generates an identifier of an external group corresponding to the device group, and requests an SCEF to create an external group according to the identifier of the external group and an external device identifier of the member device supporting the mobile network multicast communication manner. When receiving a group access request, the mobile network platform obtains the device group in the group, learns of the corresponding external group, and accordingly, requests the SCEF to access a member device in the external group in a multicast communication manner.

Figure 2:
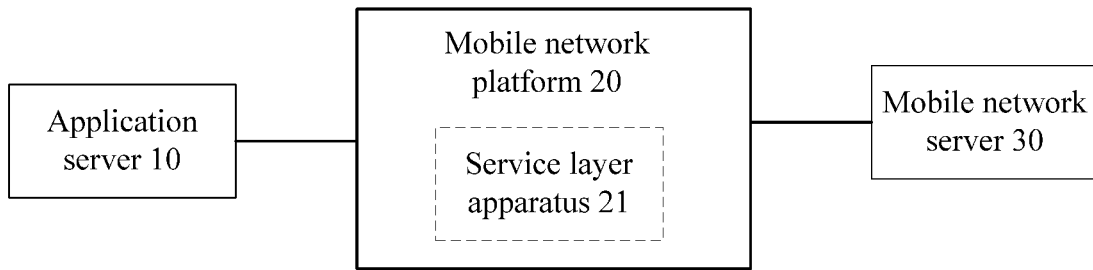
FIG. 2 is a schematic diagram of an embodiment of a system architecture according to an embodiment of the present disclosure.

FIG. 2 is a schematic diagram of an embodiment of a system architecture according to an embodiment of the present disclosure. Method procedures in FIG. 6A and FIG. 6B to FIG. 9 in the following are implemented based on this system architecture. The system architecture shown in FIG. 2 includes an application server 10, a service layer apparatus 21, a mobile network platform 20, and a mobile network server 30. In FIG. 2, the service layer apparatus 21 is an apparatus integrated in the mobile network platform 20, and the application server 10 may directly communicate with the mobile network platform 20. Optionally, in a scenario in which a mobile network may be a 3GPP network, the mobile network server 30 may be an underlying network capability exposure server (for example, an SCEF).

The application server 10 is a server that carries an application, for example, an AE, or a server that carries a meter reading application of an electrical grid company. The application server 10 in the present disclosure may send a group access request in order to receive a response that is of each member device supporting a mobile network multicast communication manner and that is collected by the mobile network platform 20, and receive a response of each member device that does not support the mobile network multicast communication manner. The application server 10 in the present disclosure may also send a group create request such that the mobile network platform 20 creates a device group and requests the mobile network server 30 to create an external group. Finally, the application server 10 receives a group creation success response sent by the mobile network platform.

The mobile network platform 20 may be an IN-CSE. When the service layer apparatus 21 is integrated in the mobile network platform 20, the mobile network platform 20 may communicate with the application server 10 and the SCEF, and is configured to receive the group access request and the group create request, create the device group and request the SCEF to create the external group, and receive the response that is of the member device supporting the mobile network multicast communication manner and that is forwarded by the SCEF.

The mobile network server 30 may be the SCEF, and may provide the mobile network platform 20 with an interface for invoking an underlying network capability, receive a multicast request from the mobile network platform 20, receive the response of each member device supporting the mobile network multicast communication manner, and receive an external group create request sent by the mobile network platform 20 so as to create the external group.

Figure 3:
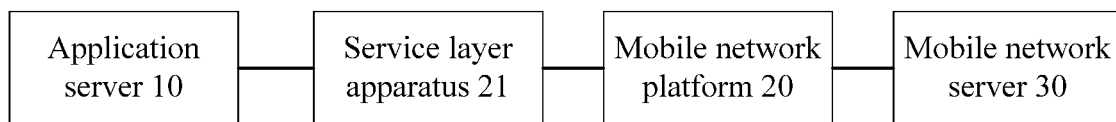
FIG. 3 is a schematic diagram of another embodiment of a system architecture according to an embodiment of the present disclosure.

FIG. 3 is a schematic diagram of another embodiment of a system architecture according to an embodiment of the present disclosure. Method procedures in FIG. 6A and FIG. 6B to FIG. 9 in the following are implemented based on this system architecture. The system architecture shown in FIG. 3 includes an application server 10, a service layer apparatus 21, a mobile network platform 20, and a mobile network server 30. In the system architecture provided in FIG. 3, the service layer apparatus 21 is an apparatus independent of the mobile network platform 20, and is configured to communicate with the application server 10 and the mobile network platform 20.

The application server 10 is configured to send a group access request to the service layer apparatus 21 in order to receive a response that is of each member device supporting a mobile network multicast communication manner and that is collected by the mobile network platform 20 and forwarded by the service layer apparatus 21, and receive a response that is of each member device that does not support the mobile network multicast communication manner and that is forwarded by the service layer apparatus 21. The application server 10 is further configured to send a group create request to the service layer apparatus 21, and receive a group creation success response forwarded by the service layer apparatus 21.

The service layer apparatus 21 may be an apparatus that is on an M2M network and that may implement a group function, for example, an apparatus (such as a gateway provided with a CSE, or a middle node or a platform provided with a CSE) to which a CSE having the group function belongs. When the service layer apparatus 21 is independent of the mobile network platform 20, the service layer apparatus 21 may receive the group access request sent by the application server 10, obtain a device group in a group, and send, to the mobile network platform 20, an access request that is for the device group and that includes an identifier of the device group and request content of the group access request. Further, the service layer apparatus 21 may receive the group create request sent by the application server 10, identify the member device supporting the mobile network multicast communication manner, and request the mobile network platform 20 to create the device group. The service layer apparatus 21 may further forward, to the application server 10, the creation success response from the mobile network platform 20 and an access response of the member device.

The mobile network platform 20 communicates with the service layer apparatus 21 and an SCEF, and is configured to receive the access request for the device group that is sent by the service layer apparatus 21, search for a corresponding external group according to the access request for the device group, and request, from the SCEF, access to a device in the external group. The mobile network platform 20 is further configured to receive a device group create request sent by the service layer apparatus 21, learn of the member device supporting the mobile network multicast communication manner, create the device group according to the member device supporting the mobile network multicast communication manner, and request the SCEF to create the corresponding external group.

For details about a function implemented by the mobile network server 30, refer to description of FIG. 2. Details are not described herein again.

Figure 4:
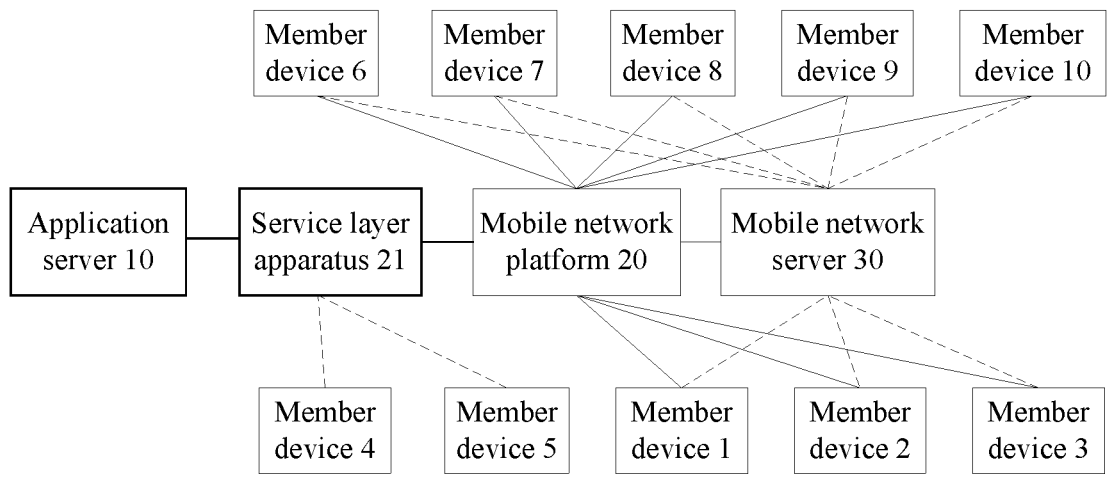
FIG. 4 is a schematic diagram of another embodiment of a system architecture according to an embodiment of the present disclosure.

FIG. 4 is a schematic diagram of another embodiment of a system architecture according to an embodiment of the present disclosure. Method procedures in FIG. 6A and FIG. 6B to FIG. 9 in the following are implemented based on this system architecture. The system architecture shown in FIG. 4 includes an application server 10, a service layer apparatus 21, a mobile network platform 20, a mobile network server 30, and a member device 1 to a member device 10. The service layer apparatus 21 may be the service layer apparatus 21 described in FIG. 2 or FIG. 3. In FIG. 4, a dashed line connecting the service layer apparatus 21 and each of the member device 4 and the member device 5 indicates that the service layer apparatus 21 directly performs unicast communication with each of the member device 4 and the member device 5. A dashed line connecting the mobile network server 30 and each of the member device 1 to the member device 3 and the member device 6 to the member device 10 indicates that the mobile network server 30 sends an access command to each of the member device 1 to the member device 3 and the member device 6 to the member device 10 in a mobile network multicast communication manner. A solid line connecting the mobile network platform 20 and each of the member device 1 to the member device 3 and the member device 6 to the member device 10 indicates that after receiving the access command sent by the mobile network server 30, each of the member device 1 to the member device 3 and the member device 6 to the member device 10 directly sends response information to the mobile network platform 20.

The member device may be an ASN, an ADN, an MN, or the like in ONEM2M, may directly communicate with the mobile network platform 20 or the service layer apparatus 21 that serves as a group device, or may communicate with a service layer using the mobile network server 30 (a network carried by an SCEF) on an underlying network. Further, the member device 1, the member device 2, the member device 3, the member device 6, the member device 7, the member device 8, the member device 9, and the member device 10 support the mobile network multicast communication manner and have a subscription relationship with a mobile network service provider, and therefore may communicate with the mobile network platform 20 using the mobile network server 30. However, the member device 4 and the member device 5 do not have a wireless network capability and do not have a subscription relationship with an underlying network service provider, and therefore can communicate, only using another network such as a network based on an Internet Protocol (IP) protocol stack, with the service layer apparatus 21 that serves as a group device. When the service layer apparatus 21 and the mobile network platform 20 are integrated, the member device 4 and the member device 5 directly communicate with the mobile network platform 20. In the present disclosure, a member device supporting the mobile network multicast communication manner can receive an access request that is sent by the SCEF in a multicast communication manner, and make a response. A member device that does not support the mobile network multicast communication manner receives an access request that is sent by the service layer apparatus 21 or the mobile network platform 20 using another network.

For details about corresponding functions of the application server 10, the service layer apparatus 21, the mobile network platform 20, and the mobile network server 30, refer to description of FIG. 2 or FIG. 3. Details are not described herein again.

A mobile network in this embodiment of the present disclosure is not limited to a 3GPP network, or may be a Long Term Evolution (LTE), Universal Mobile Telecommunication System (UMTS), Worldwide Interoperability for Microwave Access (WIMAX) network, or the like.

This embodiment of the present disclosure not only can be applied to a meter reading service of an electrical grid company, and may also be applied to a service scenario such as smart household, an in-vehicle system, or urban monitoring. For the smart household, an application server may serve a smart terminal such as a mobile phone, and using a mobile network multicast function, request related appliance data from household appliances that are distributed in a same home environment and belong to a same external group, and implement a function of controlling the household appliances in the same external group. For the in-vehicle system, an application server may serve an in-vehicle software provider, and using a mobile network multicast function, request in-vehicle system version data from in-vehicle devices that are distributed at various places across the world and that belong to a same external group, and implement a function of updating in-vehicle system data. For the urban monitoring, an application server may be a monitoring server, and using a mobile network multicast function, request monitoring data from monitoring devices that are distributed at various places in a city and that belong to a same external group, and implement a function of controlling a same external group of monitors.

According to this embodiment of the present disclosure, an amount of information generated due to interaction between an M2M platform and an M2M device may be reduced, reducing resource overheads. Therefore, a member device no longer needs to actively join a group during multicast, thereby implementing centralized scheduling by the mobile network platform.

Figure 5:
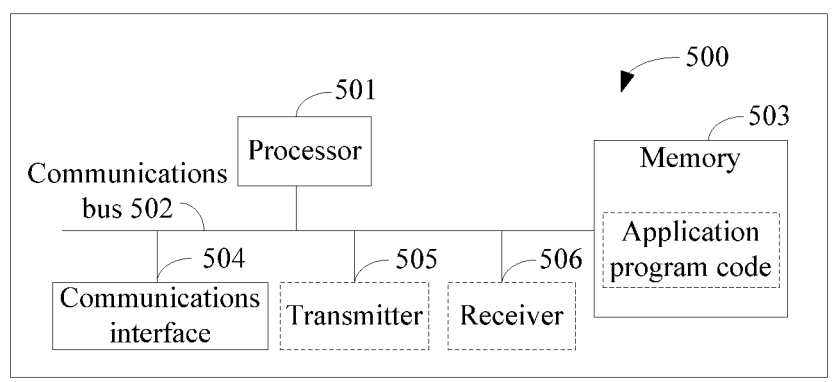
FIG. 5 is a schematic diagram of a computer device according to an embodiment of the present disclosure.

As shown in FIG. 5, the mobile network platforms in FIG. 2 to FIG. 4 may be implemented using a computer device (or a system) in FIG. 5.

FIG. 5 shows a schematic diagram of a computer device 500 according to an embodiment of the present disclosure. The computer device 500 includes at least one processor 501, a communications bus 502, a memory 503, at least one communications interface 504, a transmitter 505, and a receiver 506.

The processor 501 may be a general-purpose central processing unit (CPU), a microprocessor, an application-specific integrated circuit (ASIC), or one or more integrated circuits that are configured to control execution of a program in the solution of the present disclosure.

The communications bus 502 may include a channel for transferring information between the foregoing components. The communications interface 504 is configured to communicate with another device or a communications network such as an Ethernet, a radio access network (RAN), or a wireless local area network (WLAN) using any apparatus of a transceiver type.

The memory 503 may be but is not limited to a read-only memory (ROM) or another type of static storage device that may store static information and an instruction, a random access memory (RAM) or another type of dynamic storage device that may store information and an instruction, an electrically erasable programmable ROM (EEPROM), a compact disc ROM (CD-ROM) or another compact disc memory, an optical disc memory (including a compressed disc, a laser disc, a digital universal disc (DVD), a BLU-RAY DISC, or the like), a magnetic disk storage medium or another magnetic storage device, or any other medium that can be used to carry or store expected program code having an instruction or data structure form and that can be accessed by a computer. The memory 503 may exist independently and be connected to the processor 501 using the communications bus 502, or the memory 503 may be integrated with the processor 501.

The memory 503 is configured to store application program code used to execute the solution of the present disclosure, and execution of the application program code is controlled by the processor 501.

When the computer device 500 shown in FIG. 5 is a mobile network platform, in one aspect, code stored in the memory 503 may execute the group multicast method provided in the present disclosure, for example, obtain a device group including a member device supporting a mobile network multicast communication manner and then determine an identifier of an external group that corresponds to the device group and that is stored in a mobile network server. In another aspect, code stored in the memory 503 may further execute the group creation method provided in the present disclosure, for example, obtain a group identifier and a device identifier of a member device in a group according to a group create request, determine, using the device identifier of the member device, a member device supporting a mobile network multicast communication manner in the group, and create a group indicated by the group identifier and a device group that includes the member device supporting the mobile network multicast communication manner, and finally, generate an identifier of an external group that corresponds to the device group and that is stored in the mobile network server.

When the computer device 500 shown in FIG. 5 is a service layer apparatus, in one aspect, code stored in the memory 503 may execute the group multicast method provided in the present disclosure, for example, learn of a device group identifier in a group, and then send an access request for a device group to a mobile network platform. After receiving the access request for the device group, the mobile network platform determines an identifier of an external group corresponding to the device group, sends a mobile network multicast request to a mobile network server, and performs related procedures implemented by mobile network platforms in FIG. 6A and FIG. 6B, and FIG. 7A and FIG. 7B. In another aspect, code stored in the memory 503 may further execute the group creation method provided in the present disclosure, for example, obtain a group identifier and a device identifier of a member device in a group using a group create request, determine, according to the device identifier of the member device, a member device supporting a mobile network multicast communication manner in the group, and perform a related procedure implemented by a mobile network platform in FIG. 8A and FIG. 8B, and then request the mobile network platform to create a device group including an identifier of the member device supporting the mobile network multicast communication manner.

When the computer device 500 shown in FIG. 5 is a member device, code stored in the memory 503 may execute the group multicast method provided in the present disclosure, for example, obtain, from an access command sent by a mobile network server, request content and a response address that is allocated by a mobile network platform. Then, the member device sends response information for the request content to the mobile network platform according to the response address.

In specific implementation, in an embodiment, the computer device 500 may further include the transmitter 505 and the receiver 506. The transmitter 505 communicates with the processor 501, and may send information in multiple manners. The receiver 506 communicates with the processor 501, and may receive, in multiple manners, signaling sent by an application server or a service layer apparatus.

The foregoing computer device 500 may be a general-purpose computer device or a dedicated computer device. In specific implementation, the computer device 500 may be a desktop computer, a portable computer, a network server, a personal digital assistant (PDA), a mobile phone, a tablet computer, a wireless terminal device, a communications device, an embedded device, or a device having a structure similar to that in FIG. 5. This embodiment of the present disclosure does not limit a type of the computer device 500.

In this embodiment of the present disclosure, an M2M group is a group that is stored in the service layer apparatus and that receives various operations performed by the application server on the M2M group. A device group is a group that includes a member device supporting mobile network multicast in the M2M group and that is created, according to whether each member device in the M2M group supports mobile network multicast, by the mobile network platform instructed by the service layer apparatus after the service layer apparatus receives an M2M group create command sent by the application server. A device group identifier is included in a group resource of the M2M group. An external group is a group created by the mobile network server according to an instruction of the mobile network platform. A member device in the external group is the member device included in the device group.

Figure 6A:
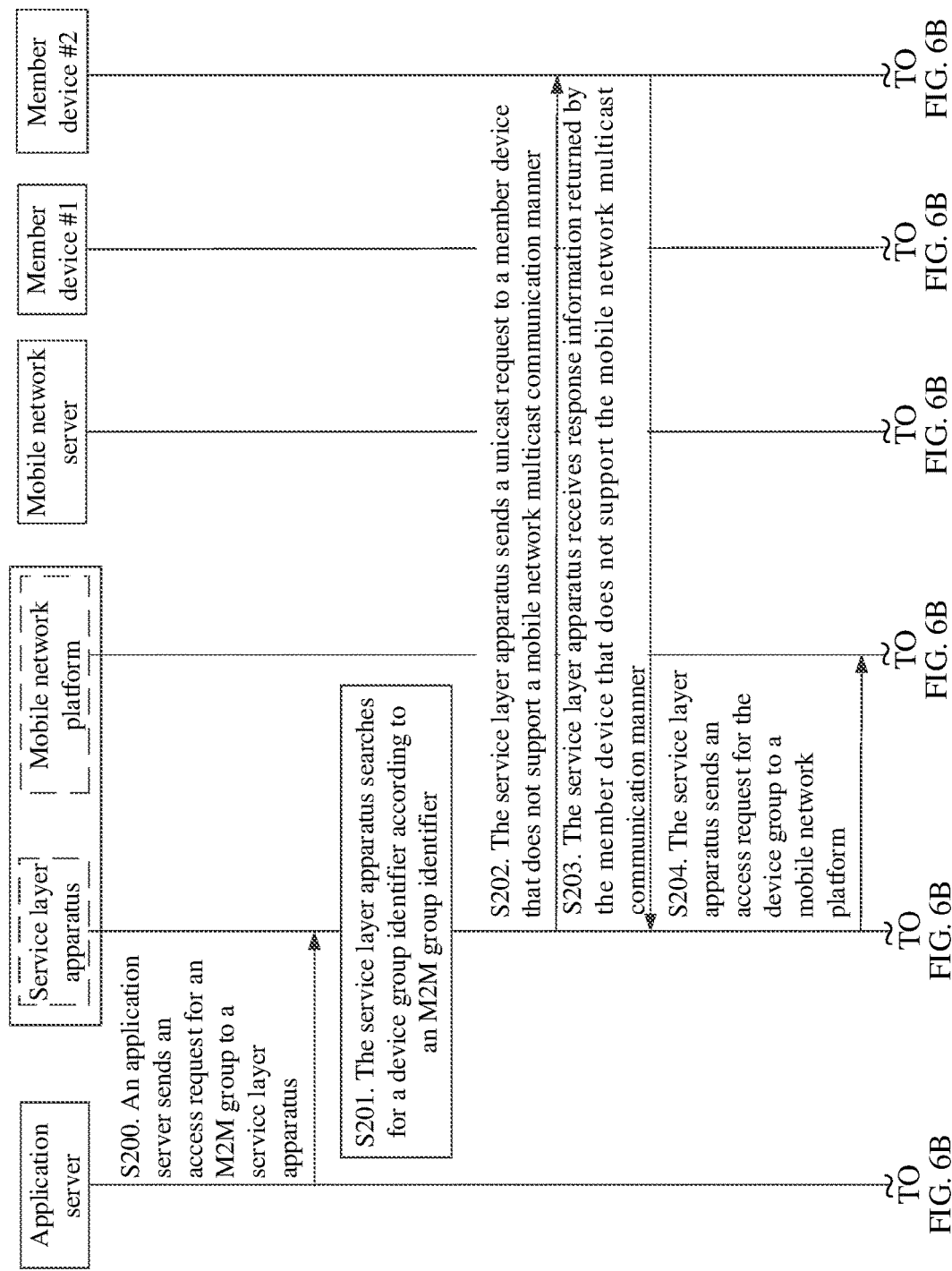
FIG. 6A and FIG. 6B are a schematic flowchart of a group multicast method according to a first embodiment of the present disclosure.
Figure 6B:
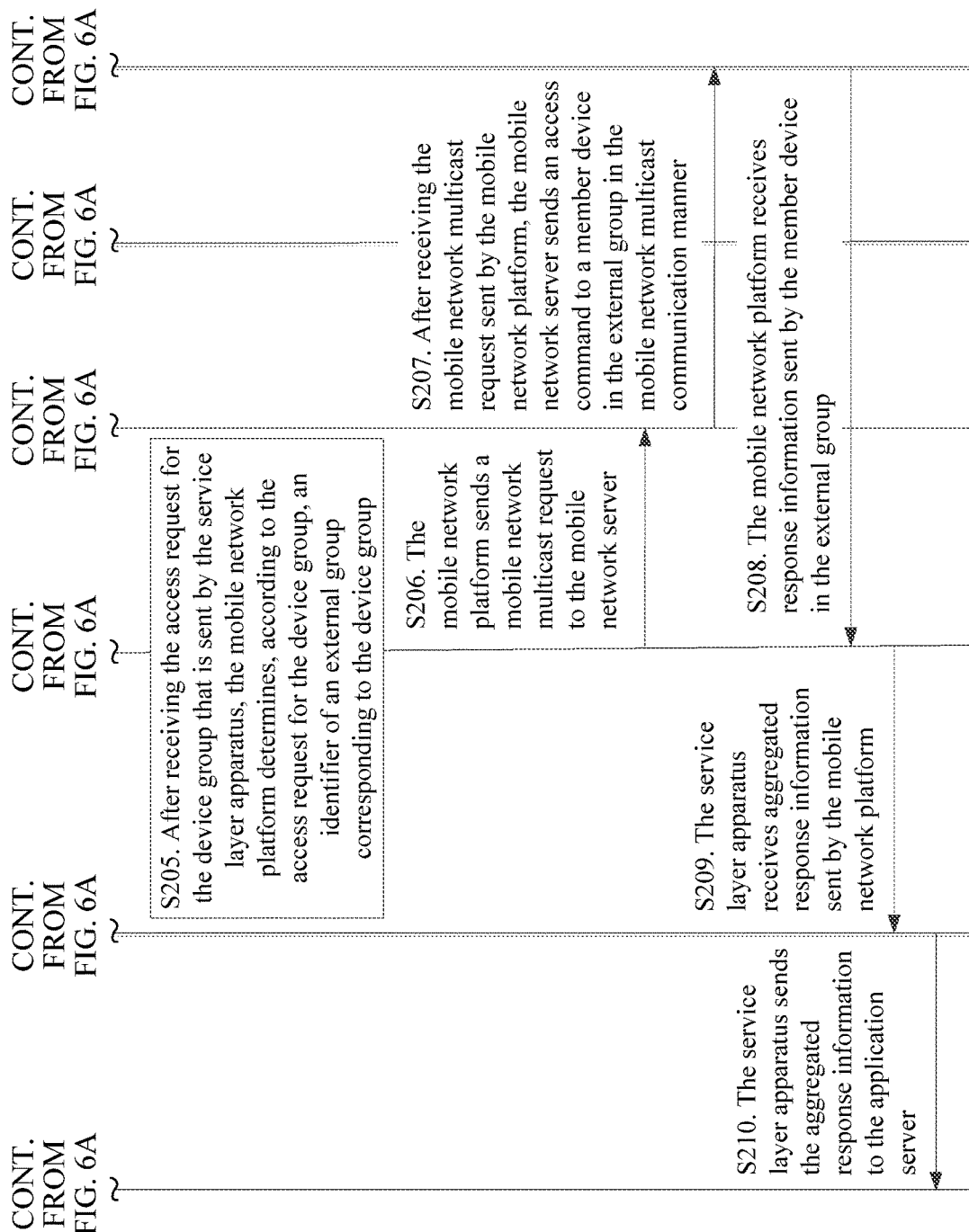

FIG. 6A and FIG. 6B are a schematic flowchart of a group multicast method according to a first embodiment of the present disclosure. The method is implemented by the application server, the service layer apparatus, the mobile network platform, the mobile network server, and the member devices in the system architecture shown in FIG. 2 to FIG. 4. FIG. 6A and FIG. 6B mainly describe a group multicast access procedure. In addition, an underlying network in an application scenario of this embodiment is a 3GPP network. Therefore, the service layer apparatus may be any one of an ASN-CSE, an MN-CSE, or an IN-CSE in ONEM2M. When the service layer apparatus is an ASN-CSE or an MN-CSE, the service layer apparatus is independent of the mobile network platform, or when the service layer apparatus is an IN-CSE, the service layer apparatus may be integrated in the mobile network platform. The mobile network platform may be an IN-CSE, the mobile network server may be an SCEF, and the member device may be an ASN, an MN, an ADN, or the like. In FIG. 6A and FIG. 6B, a member device that does not support a mobile network multicast communication manner is denoted as a member device #1, and a member device in an external group is denoted as a member device #2. The member device in the external group supports the mobile network multicast communication manner.

A procedure of the group multicast method in the embodiment shown in FIG. 6A and FIG. 6B may include the following steps.

Step S200. The application server sends an access request for an M2M group to the service layer apparatus.

Further, the group access request carries an M2M group identifier and request content. An M2M member device in the M2M group may communicate with an M2M platform in an Internet of Things field. Adding a preset quantity of M2M member devices to the M2M group can implement centralized scheduling and control by the mobile network server such that the mobile network server can access the member devices in the M2M group in a multicast form. The service layer apparatus learns of, using the group identifier carried in the group access request, a group ID of the group that the application server requests to access. The request content includes requesting to access a member device included in the group, and performing an operation on a member resource in the group. For example, the group access request may be a create, retrieve, update, delete, or notify (CRUDN) request for the member resource. The group access request carries the group ID, for example, a group 1.

In this embodiment, as shown in FIG. 4, it may be assumed that the group 1 includes 10 member devices, the member devices 1 to 10 shown in FIG. 4. A device group includes a member device supporting the mobile network multicast communication manner in the group indicated by the M2M group identifier group 1, that is, includes the member device 1, the member device 2, the member device 3, the member device 6, the member device 7, the member device 8, the member device 9, and the member device 10. An attribute of the device group is mobile network multicast (for example, 3GPP multicast). In addition, the group 1 further includes the member devices supporting the mobile network multicast communication manner. These member devices supporting the mobile network multicast communication manner may directly receive, using the 3GPP network, a message sent by the mobile network server, without requiring the mobile network platform to send the group access request separately to these member devices supporting the mobile network multicast communication manner. Therefore, the member devices in the device group are devices supporting the mobile network multicast communication manner (for example, a device having a 3GPP communication capability).

Step S201. The service layer apparatus searches for a device group identifier according to an M2M group identifier.

Further, the service layer apparatus searches for the pre-stored device group identifier according to the obtained M2M group identifier (for example, the identifier of the device group is a group 3GPP in this embodiment of the present disclosure). The device group includes the member device supporting the mobile network multicast communication manner in the group indicated by the M2M group identifier, that is, includes the member device 1, the member device 2, the member device 3, the member device 6, the member device 7, the member device 8, the member device 9, and the member device 10. The attribute of the device group is mobile network multicast (for example, 3GPP multicast).

Step S202. The service layer apparatus sends a unicast request to a member device that does not support the mobile network multicast communication manner.

Further, in FIG. 6A and FIG. 6B, the member device that does not support the mobile network multicast communication manner is denoted as the member device #1, and the member device in the external group is denoted as the member device #2. The member device in the external group supports the mobile network multicast communication manner. The application server cannot determine whether a member device in the group has an external communication capability. Therefore, the service layer apparatus determines the member device that does not support the mobile network multicast communication manner, and then sends, in a conventional manner, a request to the member device that does not support the mobile network multicast communication manner, for example, a unicast request. Referring to FIG. 4, the service layer apparatus sends a unicast request to access the member device 4 and the member device 5 that do not support the mobile network multicast communication manner.

It should be noted that, there is no strict time sequence between steps S202 and S201.

Step S203. The service layer apparatus receives response information returned by the member device that does not support the mobile network multicast communication manner.

Further, after receiving the response information returned by the member device 4 and the member device 5, the service layer apparatus forwards the response information to the application server such that the application server accesses the member device 4 and the member device 5 in another communication manner, for example, accesses the member device 4 and the member device 5 using an IP network.

In an optional manner of this embodiment of the present disclosure, steps S202 and S203 are not mandatory steps for implementing this embodiment of the present disclosure. When all member devices included in the group support the mobile network multicast communication manner, steps S202 and S203 may be not performed.

Step S204. The service layer apparatus sends an access request for the device group to the mobile network platform.

It should be noted that, for the device group including the member devices supporting the mobile network multicast communication manner, the service layer apparatus determines that a group attribute of the device group is a device group of an external network (for example, the 3GPP network), and sends the access request for the device group to the mobile network platform (for example, an IN-CSE). The access request for the device group includes the identifier of the device group and the request content in the group access request sent by the application server to the service layer apparatus such that the mobile network platform sends a mobile network multicast request to the mobile network server according to the access request for the device group.

It should be noted that step S202 and step S204 are a specific implementation in which the mobile network platform searches for the device group identifier according to the M2M group identifier.

Step S205. After receiving the access request for the device group that is sent by the service layer apparatus, the mobile network platform determines, according to the access request for the device group, an identifier of an external group corresponding to the device group.

Further, related information of the external group is stored in the mobile network server. A member device in the external group is the member device in the device group. The mobile network platform stores a correspondence between the external group and the device group (for example, a group 3GPP), that is, stores a correspondence between the identifier of the external group and the device group identifier. After determining, according to the device group identifier in the access request for the device group, the device group (for example, a group 3GPP) that the service layer apparatus requests to access, the mobile network platform obtains, according to the correspondence between the identifier of the external group and the device group identifier, the identifier that corresponds to the identifier group 3GPP of the device group and that is of the external group in the mobile network server (in this embodiment of the present disclosure, the identifier of the external group may be an external group identifier (external group ID)).

It should be noted that, the member device in the external group is the member device in the device group, that is, the member device in the external group is the same as the member device in the device group. For example, the device group 3GPP includes the member device 1, the member device 2, the member device 3, the member device 6, the member device 7, the member device 8, the member device 9, and the member device 10. Correspondingly, the external group in the mobile network server also includes the member device 1, the member device 2, the member device 3, the member device 6, the member device 7, the member device 8, the member device 9, and the member device 10. In this embodiment of the present disclosure, a mobile network (for example, 3GPP) multicast function can be implemented for the member devices of the external group only after the external group is created on the mobile network server.

Step S206. The mobile network platform sends a mobile network multicast request to the mobile network server.

Further, the mobile network platform sends the mobile network multicast request to the mobile network server (for example, an SCEF). The mobile network multicast request carries the identifier (external group ID) of the external group and the request content. The mobile network multicast request instructs the mobile network server to send an access command to the member device in the external group in the mobile network multicast communication manner. The access command carries the request content, to request to access the member device in the external group.

Step S207. After receiving the mobile network multicast request sent by the mobile network platform, the mobile network server sends an access command to a member device in the external group in the mobile network multicast communication manner.

It should be noted that this step belongs to the other approaches, and is not described in detail in this embodiment of the present disclosure.

Step S208. The mobile network platform receives response information sent by the member device in the external group.

Further, after receiving the access command sent by the mobile network server in the multicast communication manner, the member device in the external group returns the response information to the mobile network platform. If the mobile network platform receives the response information of each member device in the external group, the mobile network platform aggregates the response information to generate aggregated response information, and finally sends the aggregated response information to the service layer apparatus. In a mobile network (for example, 3GPP) multicast scenario, the member device supporting the mobile network multicast communication manner cannot return a response using a link of the mobile network multicast request. Therefore, the mobile network platform (for example, the IN-CSE) needs to receive response information sent by the member device in the device group to determine whether the member device successfully receives the access request, and makes a response. The IN-CSE may create a response resource for the device group to receive the response from each member device, and allocate a response address to the response resource. The response address of the response resource may be (//response_collection). For details about a process in which the mobile network platform receives the response information, refer to FIG. 7A and FIG. 7B in the following embodiment.

Step S209. The service layer apparatus receives aggregated response information sent by the mobile network platform.

Step S210. The service layer apparatus sends the aggregated response information to the application server.

Further, the service layer apparatus forwards, to the application server, the aggregated response information sent by the IN-CSE.

It may be learned from the above that, in this embodiment of the present disclosure, after the service layer apparatus receives the group access request sent by the application server, the service layer apparatus sends the unicast request to the member device that does not support the mobile network multicast communication manner, and forwards the access request for the device group to the IN-CSE such that the IN-CSE distributes the access command to the member device in the external group in the multicast communication manner using the SCEF, receives the response information returned by the member device, and forwards the response information to the application server. In this way, the command may be sent to and the response may be collected from the member device in the external group. Therefore, member devices do not need to separately initiate an operation of joining a specified group in the mobile network platform. This reduces an amount of information generated due to interaction between the M2M platform and the M2M device, reduces resource overheads, and implements centralized scheduling by the mobile network platform.

It should be noted that steps S204 to S208 in this embodiment may be further detailed. For details, refer to a method procedure described in FIG. 7A and FIG. 7B in the following.

Figure 7A:
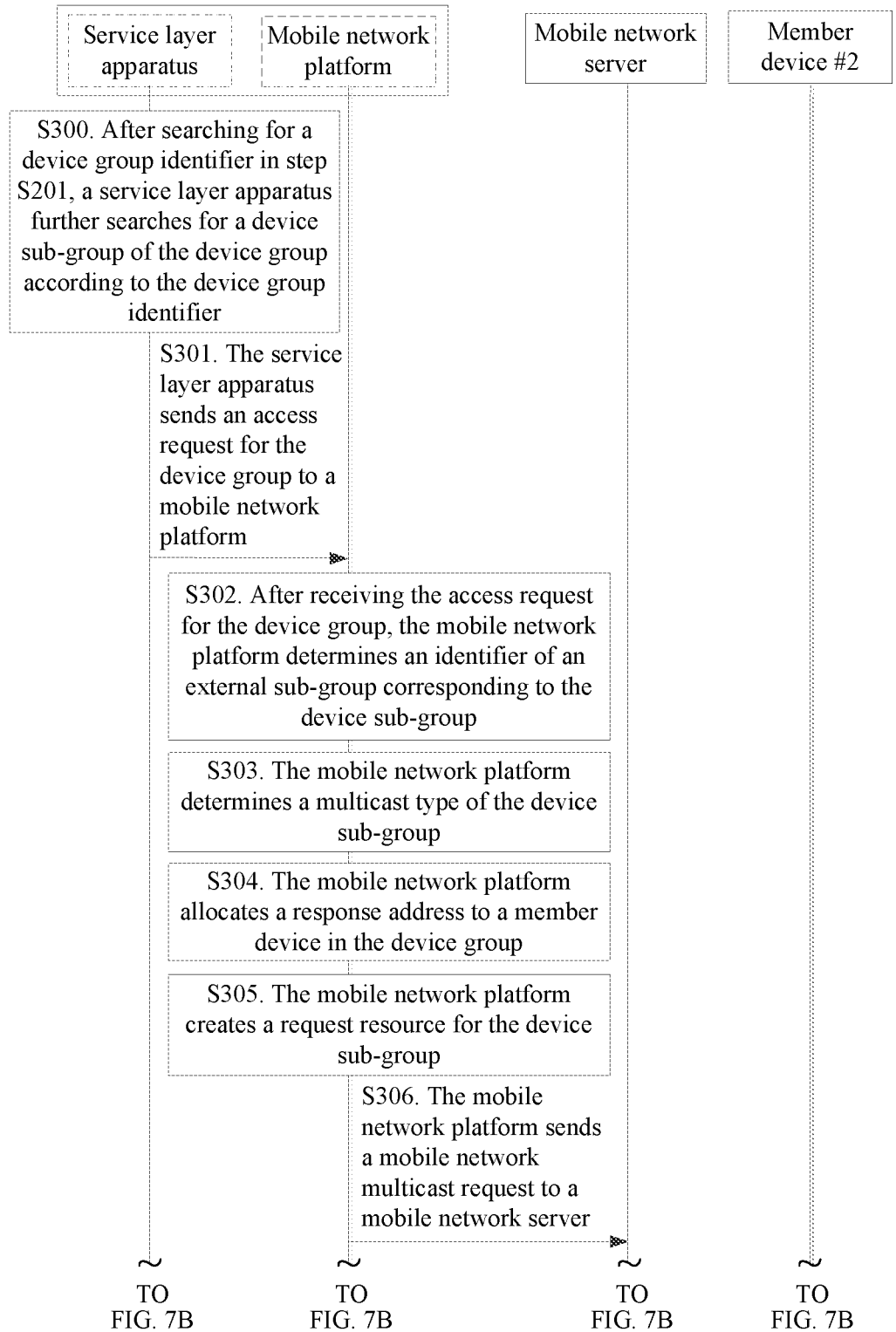
FIG. 7A and FIG. 7B are a schematic flowchart of another group multicast method according to a first embodiment of the present disclosure.
Figure 7B:
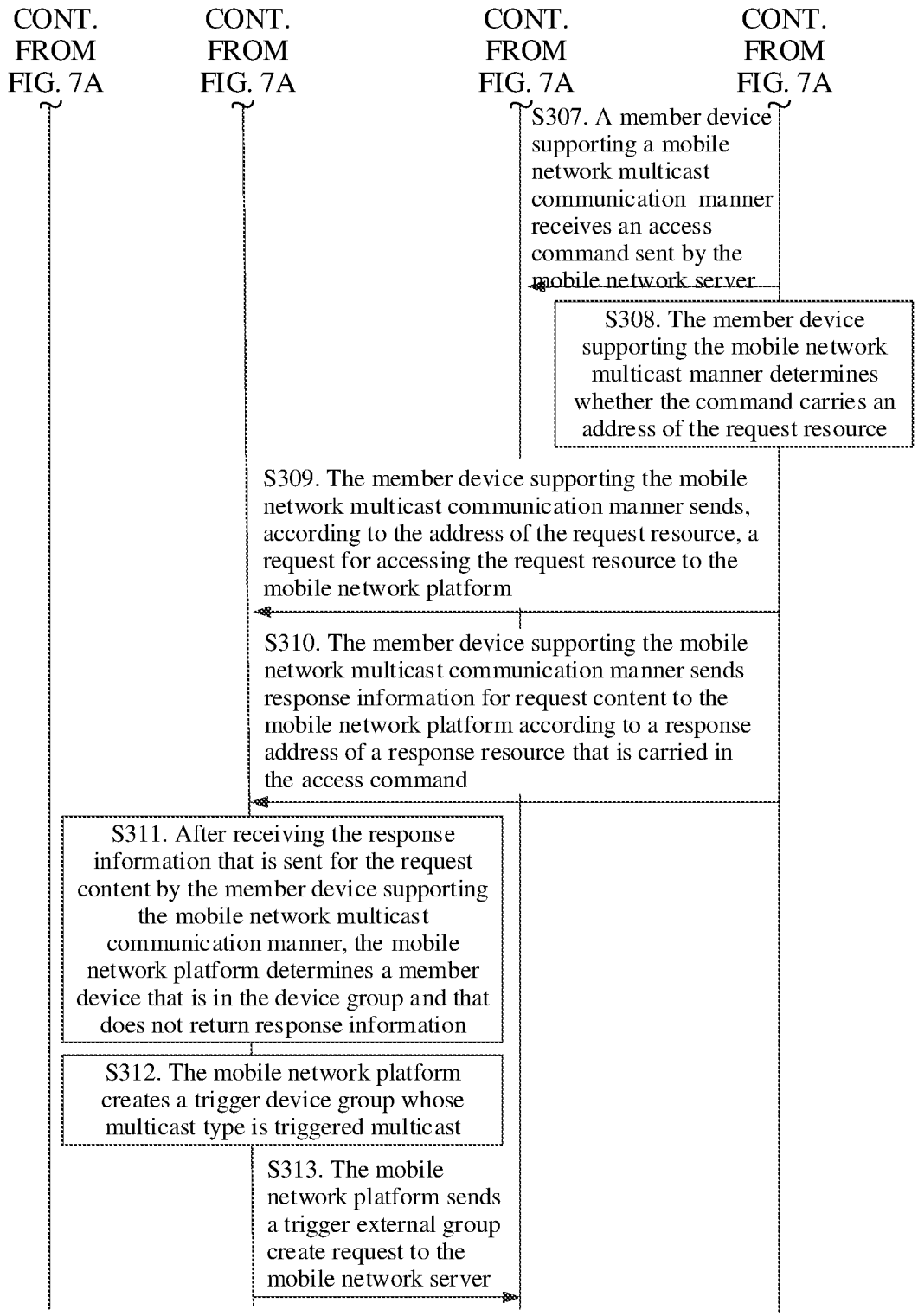

FIG. 7A and FIG. 7B are a schematic flowchart of another group multicast method according to an embodiment of the present disclosure, and are a detailed process of steps S204 to S208 in the embodiment of FIG. 6A and FIG. 6B. A multicast type in this embodiment of the present disclosure includes any one or more of an MBMS, a CBS, and a PDN. This method further details steps S204 to S208 in FIG. 6A and FIG. 6B. A procedure of the group multicast method in the embodiment shown in FIG. 7A and FIG. 7B may include the following steps.

Step S300. After searching for the device group identifier in step S201, the service layer apparatus further searches for a device sub-group of the device group according to the device group identifier.

Further, the service layer apparatus determines the device group identifier in a group resource according to the M2M group identifier, and searches for the device sub-group of the device group.

Step S301. The service layer apparatus sends an access request for the device group to the mobile network platform.

Further, the access request for the device group includes the device group identifier and request content.

Step S302. After receiving the access request for the device group, the mobile network platform determines an identifier of an external sub-group corresponding to the device sub-group.

Further, the mobile network platform (for example, an IN-CSE) stores a resource library, and the resource library stores a resource of an external group. The resource of the external group includes resources of at least two external sub-groups, and a multicast type supported by a member device in each external sub-group. The multicast type of the external sub-group may be any one of an MBMS, a PDN, or a CBS. Each external sub-group includes a member device that corresponds to the multicast type of the external sub-group and that supports the mobile network multicast communication manner. The mobile network platform (for example, the IN-CSE) searches for the device sub-group of the device group by querying the prestored resource library according to the device group identifier, and then determines the external sub-group that corresponds to the device sub-group and that is located in the mobile network server.

Step S303. The mobile network platform determines a multicast type of the device sub-group.

Further, the identifier of the device sub-group may carry the multicast type of the device sub-group. Therefore, when obtaining the identifier of the device sub-group, the IN-CSE may determine the multicast type of the device sub-group. For example, an identifier of a CBS device sub-group is <group-CBS>, an identifier of an MBMS device sub-group is <group-MBMS>, and an identifier of a PDN device sub-group is <group-PDN>. The multicast type of the device sub-group may be learned according to the identifier of the device sub-group.

Step S304. The mobile network platform allocates a response address to the member device in the device group.

Further, the response address is used to receive the response information that is sent for the request content by the member device in the device group. In the mobile network (for example, 3GPP) multicast scenario, the member device supporting the mobile network multicast communication manner cannot return a response using the link of the mobile network multicast request. Therefore, the mobile network platform (for example, the IN-CSE) needs to receive the response information sent by the member device in the device group to determine whether the member device successfully receives the access request, and makes a response. The IN-CSE may create a response (Response) resource for the device group to receive the response from each member device, and allocate a response address to the response resource. The response address of the response resource may be (//response_collection).

In an implementable manner, the IN-CSE may set response addresses of response resources of all device sub-groups to a response address (//response_collection) of a same response resource.

In another implementable manner, the IN-CSE may further allocate a response address (//group-x/response_collection) to the member device in the device sub-group according to the multicast type of the device sub-group such that each device sub-group can independently use a response resource. For example, a response address of a response resource of an MBMS device sub-group may be //group-MBMS/response_collection, a response address of a response resource of a CBS device sub-group may be //group-CBS/response_collection, and a response address of a response resource of a PDN device sub-group may be //group-PDN/response_collection.

Step S305. The mobile network platform creates a request resource for the device sub-group.

Further, the mobile network platform determines that the multicast type of the device sub-group is a CBS, and then creates the request resource for the device sub-group. It should be noted that there is a limited amount of data obtained when a member device whose multicast type is a CBS receives a message in a multicast communication manner. For example, only an SMS message with a data amount less than a preset value can be received in a multicast communication manner. Therefore, the mobile network platform (for example, the IN-CSE) needs to create a request resource. The request content of the group access request is stored in the request resource.

It should be noted that step 305 is not necessary, and needs to be performed only when the multicast type of the device group is a CBS. If the multicast type of the device group is not CBS multicast, step 306 is performed directly.

Step S306. The mobile network platform sends a mobile network multicast request to the mobile network server.

Further, for a device group whose multicast type is an MBMS or a PDN, the mobile network multicast request sent to the mobile network server by the IN-CSE includes an external group identifier (external group ID) of the device sub-group (for example, <group-MBMS> or <group-PDN>), the response address of the response resource, and the request content. After receiving the mobile network multicast request, the mobile network server (for example, an SCEF) searches for the member device in the device sub-group according to the external group ID of the device sub-group, generates an access command according to the response address of the response resource, and performs step S307.

For a device sub-group whose multicast type is a CBS, the mobile network multicast request sent to the mobile network server by the IN-CSE includes an external group ID of the device sub-group whose multicast type is a CBS, an address of the request resource, and the response address of the response resource.

In an implementable manner, if the IN-CSE allocates a unique response address (for example, //group-x/ request) of a response resource to each device group, the mobile network multicast request sent by the IN-CSE includes the external group ID of the device sub-group (for example, <group-x>), the address (//group-x/request) of the request resource, and the response address of the response resource of each device group in order to instruct the SCEF to send a distribution or access command to a member device in the <group-x> in a multicast communication manner of the device sub-group. For example, the multicast type of the device sub-group is a CBS. The mobile network multicast request sent by the IN-CSE includes <group-CBS>, //group-CBS/request, and the response address of the response resource of each device group in order to instruct the SCEF to send the access command to the member device in the <group-CBS> in a CBS multicast communication manner. The access command includes //group-CBS/request and the response address of the response resource.

Step S307. A member device supporting a mobile network multicast communication manner receives an access command sent by the mobile network server.

Further, in FIG. 7A and FIG. 7B, the member device in the external group supports the mobile network multicast communication manner. It should be noted that the member device in the external group supports the mobile network multicast communication manner, and may receive, in the multicast communication manner, the command sent by the SCEF. The command is a distribution command or an access command.

Step S308. The member device supporting the mobile network multicast communication manner determines whether the command carries an address of the request resource.

Further, the member device determines whether the command carries the address of the request resource. If yes, the command is a distribution command, and step S309 is performed, or if no, the command is an access command, and step S310 is performed.

Step S309. The member device supporting the mobile network multicast communication manner sends, according to the address of the request resource, a request for accessing the request resource to the mobile network platform.

Further, when the address of the request resource is included, the member device receives a distribution command, and this indicates that a multicast type of the member device is a CBS. Therefore, the member device sends a retrieve request to the request resource according to the address of the request resource. The retrieve request is used to obtain the request content of the group access request from the request resource.

Step S310. The member device supporting the mobile network multicast communication manner sends response information for request content to the mobile network platform according to a response address of a response resource that is carried in the access command.

Further, the mobile network platform receives the response information that is sent for the request content by the member device in the device group to the response address. After receiving the access command sent by the SCEF, a member device in an MBMS device sub-group or a PDN device sub-group may obtain the response address of the response resource and the request content, then generate the response information for the request content, and finally send the response information to the response address of the response resource such that the IN-CSE receives a response that is sent by the member device in response to response resource access.

In another optional manner, after receiving the distribution command sent by the SCEF, a member device in a CBS device sub-group may obtain the address of the request resource and the response address of the response resource. The member device accesses the request resource in the IN-CSE according to the address of the request resource, obtains the request content of the group access request from the request resource in the IN-CSE, then generates the response information for the obtained request content, and finally sends the response information to the response address of the response resource such that the IN-CSE receives a response that is sent by the member device in response to response resource access.

Step S311. After receiving the response information that is sent for the request content by the member device supporting the mobile network multicast communication manner, the mobile network platform determines a member device that is in the device group and that has not returned response information.

Further, not all devices send response information, or the IN-CSE may not receive response information sent by all member devices. Therefore, the IN-CSE needs to determine whether the response information sent by all the member devices in the device group is received. In specific implementation, if a member device in the device group can access the response address of the response resource and send response information, a response record of the member device is added to the response resource in the IN-CSE. The IN-CSE queries the response record in the response resource, to determine the member device that is in the device group and that has not returned response information.

Step S312. The mobile network platform creates a trigger device group whose multicast type is triggered multicast.

Further, if the IN-CSE determines the member device that is in the device group and that has not returned response information, the IN-CSE creates a trigger device group <group-T4>. The trigger device group <group-T4> includes the member device that is in the device group and that has not returned response information. The multicast type of the trigger device group is triggered multicast, and step S313 is performed for the member device. The triggered multicast is a multicast type defined in 3GPP, and may be used to trigger an offline member device to receive a message.

It should be noted that step S312 may be performed after step S311 or performed before step S311. That is, after creating the trigger device group whose multicast type is triggered multicast, the mobile network platform may determine the member device that is in the device group and that has not returned response information. This embodiment does not limit an execution sequence between step S311 and step S312.

Step S313. The mobile network platform sends a trigger external group create request to the mobile network server.

Further, the trigger external group create request is used to request the mobile network server to create a trigger external group corresponding to the trigger device group. The create request includes an identifier of the trigger external group (that is, an external group ID of the <group-T4>) and an external device identifier (External ID) of the member device included in the trigger device group. After receiving the trigger external group create request, the SCEF creates the trigger external group according to the External ID of the member device included in the trigger device group and the identifier of the trigger external group (the external group ID of the <group-T4>). A multicast type of the trigger external group is a T4 multicast type. When the IN-CSE sends the mobile network multicast request to the SCEF, the SCEF sends the access command to a member device in the trigger external group in a T4 manner.

It may be learned from the above that this embodiment of the present disclosure has the following two advantages 1. For member devices of device sub-groups of different multicast types, multicast may be performed according to the different multicast types, thereby improving efficiency and a success rate. 2. When the IN-CSE cannot receive response information sent by a member device, a multicast communication manner for the member device can be changed in a timely manner, thereby ensuring a multicast success rate.

Figure 8A:
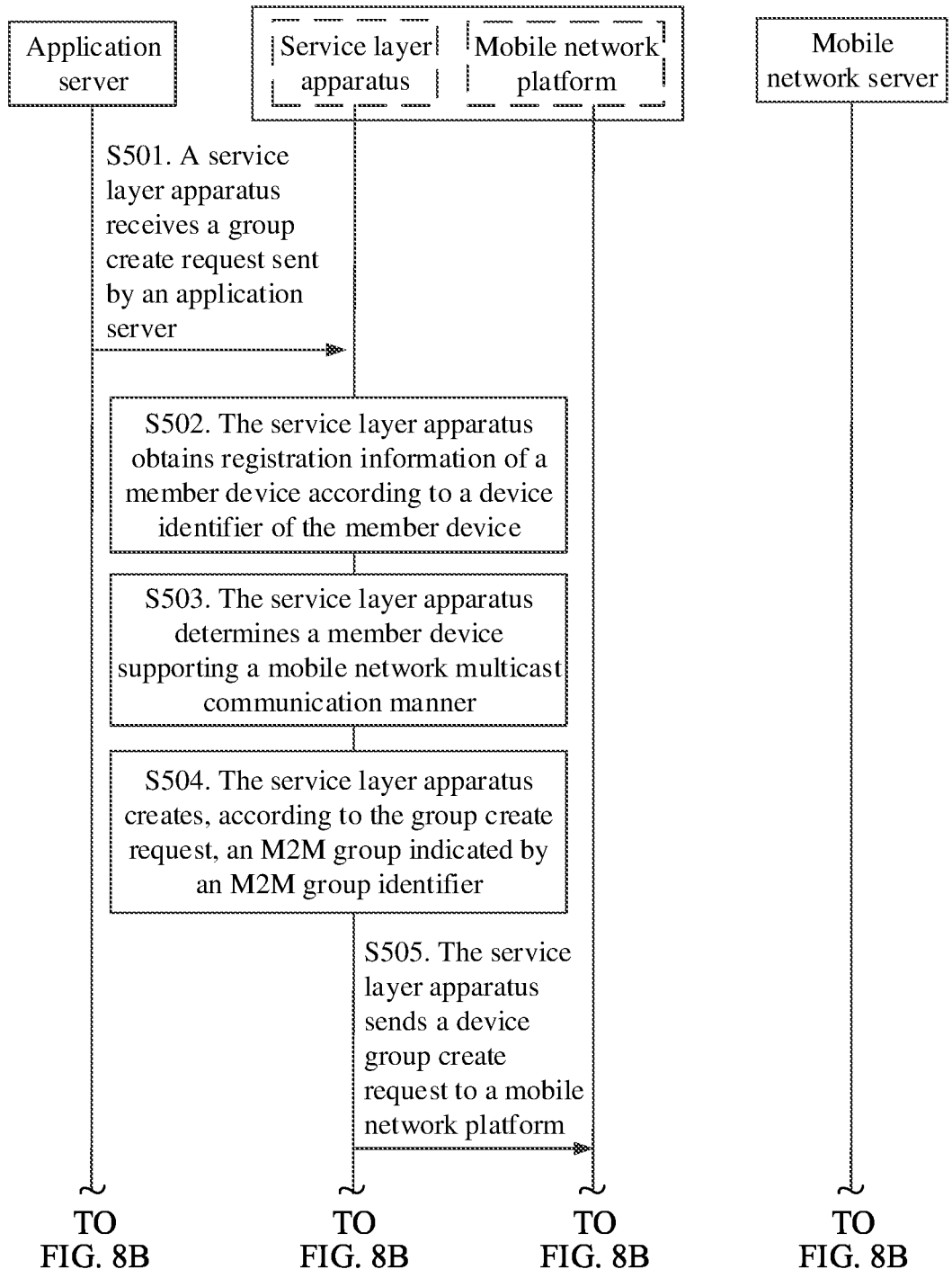
FIG. 8A and FIG. 8B are a schematic flowchart of a group creation method according to a second embodiment of the present disclosure.
Figure 8B:
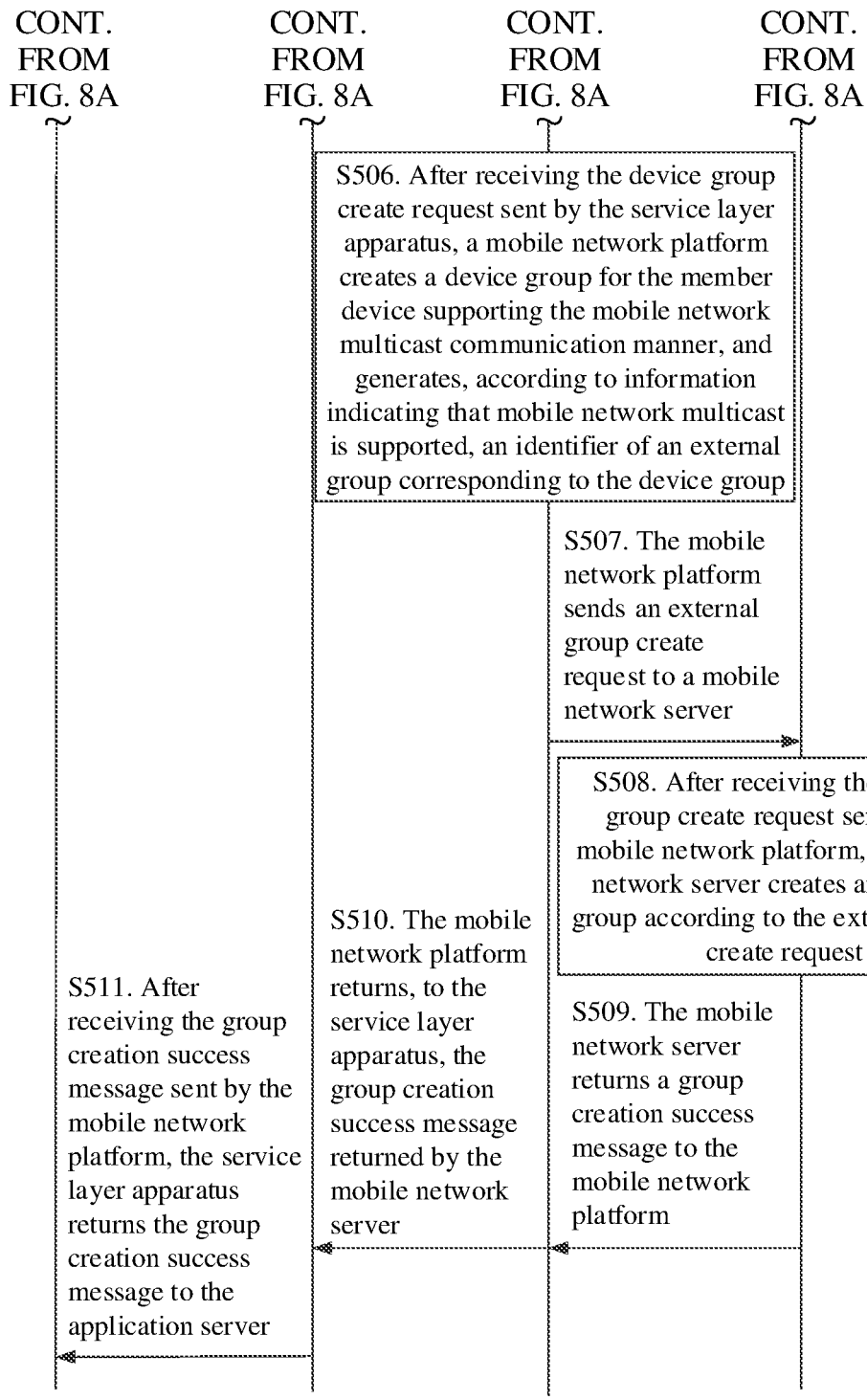

FIG. 8A and FIG. 8B are a schematic flowchart of a group creation method according to a second embodiment of the present disclosure. The method is implemented by the application server, the service layer apparatus, the mobile network platform, the mobile network server, and the member devices in the system architecture shown in FIG. 2 to FIG. 4. FIG. 8A and FIG. 8B mainly describe a group creation procedure for group multicast. In addition, an underlying network in an application scenario of this embodiment is a 3GPP network. Therefore, the service layer apparatus may be an apparatus including an ASN-CSE, a gateway including an MN-CSE, or a platform including an IN-CSE. The mobile network platform may be a platform including an IN-CSE. The mobile network server may be an SCEF. When the service layer apparatus is an ASN-CSE or an MN-CSE, the service layer apparatus is independent of the mobile network platform, or when the service apparatus is an IN-CSE, the service layer apparatus may be integrated in the mobile network platform. A procedure of the group creation method in the embodiment shown in FIG. 8A and FIG. 8B may include the following steps.

Step S501. The service layer apparatus receives a group create request sent by the application server.

Further, the application server sends the group create request to the service layer apparatus. The group create request carries an M2M group identifier and a device identifier of a member device included in a to-be-created M2M group. The M2M group identifier is, for example, a group ID. The group includes the member device 1 to the member device 10 shown in FIG. 4. The device identifier of the member device is, for example, a device ID.

Step S502. The service layer apparatus obtains registration information of a member device according to a device identifier of the member device.

Further, the service layer apparatus may obtain, from a resource library created in advance by an IN-CSE, the registration information of the member device according to the device identifier of the member device. When a member device needs to use various functions provided by the service layer apparatus, the member device needs to register with the IN-CSE. The IN-CSE stores a resource of each member device when the member device registers (for example, a resource of the member device is denoted as a resource ID), and stores registration information of each member device in the resource of each member device. The registration information includes an external device identifier used to indicate whether the member device supports a mobile network multicast communication manner (for example, the external device identifier is an external ID). For example, for a member device supporting the mobile network multicast communication manner, an external device identifier (for example, an External ID) of the member device is stored in registration information.

Further, the service layer apparatus reads the resource of the member device by sending a retrieve request to the IN-CSE, to obtain the registration information of the member device.

In another optional manner, if the service layer apparatus is integrated in an IN-CSE, the IN-CSE obtains the registration information of the member device from a resource library created in advance. When a member device needs to use various functions provided by the IN-CSE, the member device needs to register with the IN-CSE. The IN-CSE stores a resource of each member device when the member device registers, and stores registration information of each member device in a resource of the member device. The registration information includes an external device identifier used to indicate whether the member device supports a mobile network multicast communication manner.

Step S503. The service layer apparatus determines a member device supporting a mobile network multicast communication manner.

Further, the service layer apparatus determines, according to the registration information, whether each member device is a member device supporting the mobile network multicast communication manner. Further, the service layer apparatus determines, according to the registration information, whether the registration information includes an external device identifier (External ID). If the service layer apparatus finds an external device identifier (External ID) in registration information of a member device, it indicates that the member device is a member device supporting the mobile network multicast communication manner. If the service layer apparatus finds no external device identifier (External ID) in registration information of a member device, it indicates that the member device is a member device that does not support the mobile network multicast communication manner. The member device supporting the mobile network multicast communication manner supports a multicast communication manner, and can receive a command sent by the mobile network server (for example, an SCEF) using a mobile network. Therefore, the member device supporting the mobile network multicast communication manner does not need to actively join a group set by the SCEF. The service layer apparatus determines, by querying the external device identifier, the member device supporting the mobile network multicast communication manner.

Step S504. The service layer apparatus creates, according to the group create request, an M2M group indicated by an M2M group identifier.

Further, the service layer apparatus creates a group resource, and stores, in the created group resource, a device group identifier and a device identifier of the member device that does not support the mobile network multicast communication manner. The service layer apparatus creates, according to the group create request in step S501, the M2M group indicated by the M2M group identifier carried in the group create request in step S501, and generates a device group identifier for the member device supporting the mobile network multicast communication manner. The M2M group includes the generated device group identifier and the device identifier that is in the device identifier of the member device carried in the group create request in step S501 and that is of the member device that does not support the mobile network multicast communication manner.

Further, the device group identifier generated by the service layer apparatus includes information indicating that mobile network multicast is supported. For example, the device group identifier is (group 3GPP), where 3GPP is the information indicating that mobile network multicast is supported.

Step S505. The service layer apparatus sends a device group create request to the mobile network platform.

Further, the service layer apparatus sends the device group create request to the IN-CSE, to request the IN-CSE to create a device group for the member device supporting the mobile network multicast communication manner. The device group create request carries the device group identifier and an identifier of the determined member device supporting the mobile network multicast communication manner. The device group identifier may be (group 3GPP), where 3GPP is the information indicating that mobile network multicast is supported.

In an implementable manner, the device group create request may include the device group identifier (Group 3GPP) and an external device identifier (External ID) of each member device supporting the mobile network multicast communication manner.

In this embodiment of the present disclosure, the device identifier of the member device and the external device identifier of the member device in the device group create request are collectively referred to as information about the member device.

It should be understood that, in the group (Group ID), there may be a member device (such as the member device 4 and the member device 5 shown in FIG. 4) that does not support the mobile network multicast communication manner, and a device group cannot be created for the member device. Therefore, the device identifier of the member device (such as the member device 4 and the member device 5 shown in FIG. 4) that does not support the mobile network multicast communication manner is stored in the group (Group ID) as member information of the group (Group ID).

Step S506. After receiving the device group create request sent by the service layer apparatus, the mobile network platform creates a device group for the member device supporting the mobile network multicast communication manner, and generates, according to information indicating that mobile network multicast is supported, an identifier of an external group corresponding to the device group.

Further, if the IN-CSE obtains the device group identifier and a resource of the member device in the device group, the IN-CSE creates the device group according to the device group identifier (Group 3GPP) and the resource of the member device in the device group, and generates, according to the information indicating that mobile network multicast is supported, the identifier (External Group ID) of the external group corresponding to the device group. The external group identifier is used to indicate an identifier of an external group to be created on the mobile network server.

In an implementable manner, if the IN-CSE obtains the device group identifier and the external device identifier, the IN-CSE searches for a prestored resource of the member device according to the external device identifier, then creates the device group according to the device group identifier and the found resource of the member device, and generates an identifier (External Group ID) of a to-be-created external group corresponding to the device group.

Step S507. The mobile network platform sends an external group create request to the mobile network server.

Further, the external group create request includes the external group identifier, and the external device identifier of the member device supporting the mobile network multicast communication manner. The external group create request is used to instruct to create an external group whose identifier is the external group identifier and that includes the member device supporting the mobile network multicast communication manner. A member device in the external group is the member device in the device group. The IN-CSE generates the external group create request according to the identifier (External Group ID) of the to-be-created external group and the external device identifier (External ID) of the member device supporting the mobile network multicast communication manner, to request the mobile network server to create the external group according to the identifier of the to-be-created external group and the external device identifier that are carried in the external group create request in order to establish a correspondence between the device group of the IN-CSE and the external group of the SCEF.

In an implementable manner, if the device group create request that is sent by the service layer apparatus and that is received by the mobile network platform includes the device identifier of the member device supporting the mobile network multicast communication manner, the mobile network platform obtains, according to the device identifier of the member device supporting the mobile network multicast communication manner, the external device identifier of each member device supporting the mobile network multicast communication manner from the prestored registration information in the resource of the member device.

In an implementable manner, if the device group create request that is sent by the service layer apparatus and that is received by the mobile network platform includes the external device identifier of each member device supporting the mobile network multicast communication manner, the mobile network platform directly obtains the external device identifier of each member device supporting the mobile network multicast communication manner from the device group create request.

In an implementable manner, if the service layer apparatus is integrated in the mobile network platform, when querying the registration information of each member device, the mobile network platform obtains the external device identifier of each member device supporting the mobile network multicast communication manner.

Step S508. After receiving the external group create request sent by the mobile network platform, the mobile network server creates an external group according to the external group create request.

Step S509. The mobile network server returns a group creation success message to the mobile network platform.

Step S510. The mobile network platform returns, to the service layer apparatus, the group creation success message returned by the mobile network server.

Further, after creating the external group, the SCEF returns the group creation success message to the IN-CSE. After receiving the group creation success message returned by the SCEF, the IN-CSE forwards the group creation success message to the service layer apparatus.

Step S511. After receiving the group creation success message sent by the mobile network platform, the service layer apparatus returns the group creation success message to the application server.

It may be learned from the above that, after receiving the group create request sent by the application server, the service layer apparatus in this embodiment of the present disclosure determines whether there is a member device that does not support the mobile network multicast communication manner in the group. For the member device supporting the mobile network multicast communication manner, the service layer apparatus sends the device group create request to the IN-CSE such that the IN-CSE creates the device group and sends the external group create request to the SCEF. The member device in the external group includes the member device included in the device group in order to establish the correspondence between the device group of the IN-CSE and the external group of the SCEF. Therefore, member devices do not need to separately initiate an operation of joining a specified group in the mobile network platform. This reduces an amount of information generated due to interaction between an M2M platform and an M2M device, reduces resource overheads, and improves group multicast efficiency.

Figure 9:
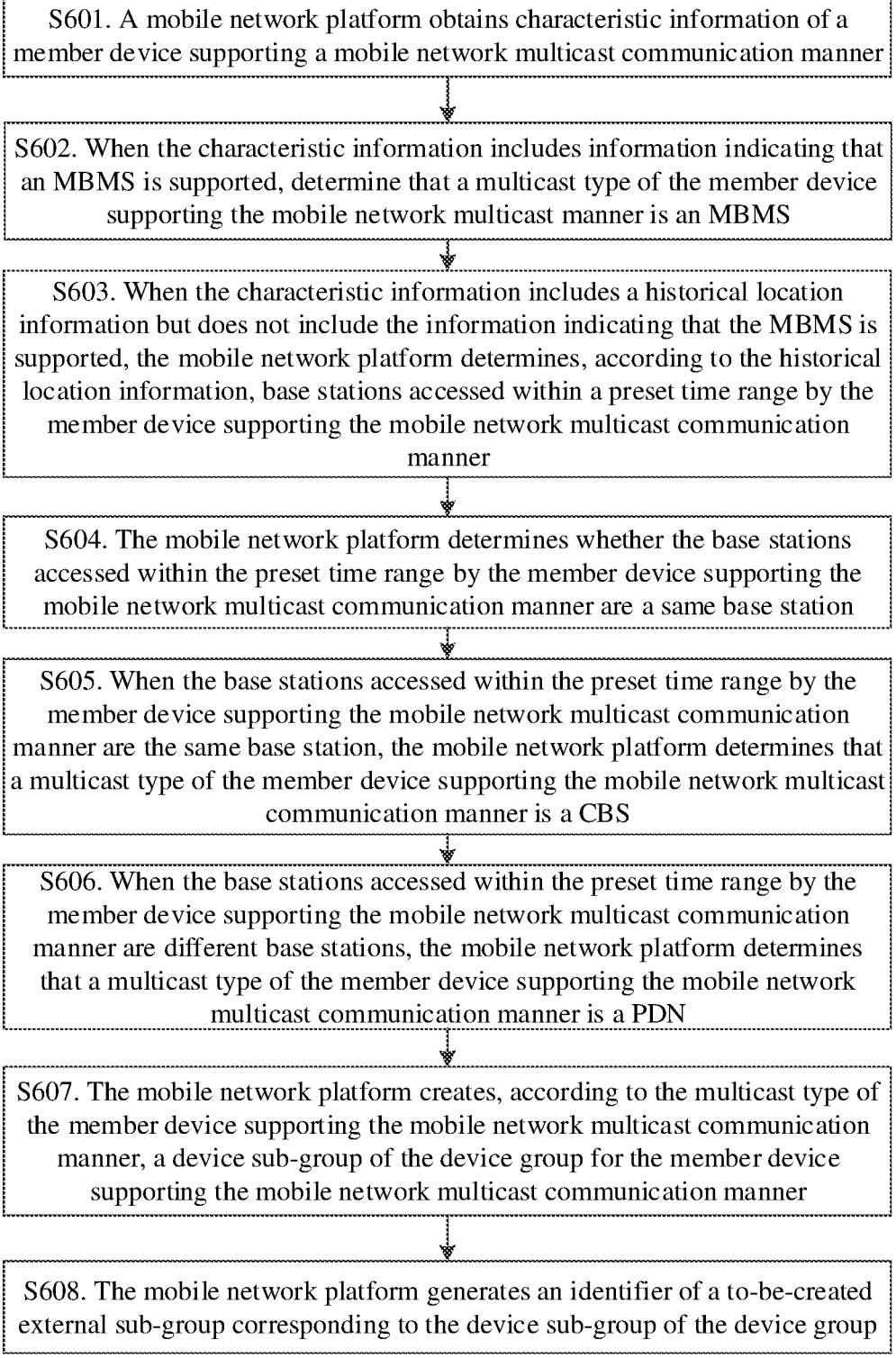
FIG. 9 is a schematic flowchart of another group creation method according to a second embodiment of the present disclosure.

FIG. 9 is a schematic flowchart of another group creation method according to the second embodiment of the present disclosure. This method further details step S506 in FIG. 8A and FIG. 8B. In this embodiment, the device group includes at least two device sub-groups. Correspondingly, external sub-groups included in the corresponding external group created by the SCEF are the device sub-groups included in the device group. A procedure of the group creation method in the embodiment shown in FIG. 9 may include the following steps.

Step S601. The mobile network platform obtains characteristic information of the member device supporting the mobile network multicast communication manner.

Further, the characteristic information includes historical location information of the member device supporting the mobile network multicast communication manner and/or information indicating that an MBMS is supported. The IN-CSE queries a data resource and a device resource in the resource of the member device in the resource library created in advance, to obtain the characteristic information of the member device supporting the mobile network multicast communication manner, and creates the device sub-groups for the external group. The characteristic information includes the historical location information of the member device supporting the mobile network multicast communication manner and/or the information indicating that the member device supporting the mobile network multicast communication manner supports the MBMS. The historical location information of the member device is stored in the data resource of the resource of the member device, and the information indicating that the MBMS is supported is stored in the device resource of the resource of the member device. The IN-CSE determines, according to the historical location information of the member device supporting the mobile network multicast communication manner and/or the information indicating that the member device supporting the mobile network multicast communication manner supports the MBMS, a multicast type of the member device supporting the mobile network multicast communication manner. The multicast type is any one of an MBMS, a PDN, or a CBS.

It should be noted that resources in the resource of the member device are in a linear connection relationship, and each resource is an independent resource.

Step S602. When the characteristic information includes information indicating that an MBMS is supported, determine that a multicast type of the member device supporting the mobile network multicast communication manner is an MBMS.

In this embodiment, it is assumed that a member device 1, a member device 2, and a member device 3 support the MBMS, and that member devices 6, 7, 8, 9, and 10 do not support the MBMS.

Further, if the characteristic information includes the information indicating that the member device supports the MBMS, the IN-CSE determines that the multicast type supported by the member device is an MBMS. The information indicating that the member device supports the MBMS may be learned using the resource of the member device stored by the IN-CSE or by the SCEF.

Further, in a manner of learning of the information using the resource of the member device that is stored by the IN-CSE, the IN-CSE may obtain description information of the member device, to determine whether the member device supports the MBMS. For example, the IN-CSE obtains the stored description information of the member device from the device resource in the resource of the member device, and then determines, according to the description information of the member device, whether the member device supports the MBMS. In a specific implementation process, a <node> resource may be created when the member device registers with the mobile network platform. The <node> resource corresponds to the member device. A sub-resource of the <node> resource is [device- Capability], which is a resource of a <mgmtObj> type. The resource stores a function supported by the member device. The IN-CSE may determine, according to whether there is MBMS description in the resource, whether the member device supports the MBMS.

Further, if no <node> resource is created when the member device registers with the mobile network platform, the IN-CSE may send an access request to a query interface exposed by the SCEF, to query capability information of the member device, and then determine, according to the capability information of the member device, whether the member device supports the MBMS. In a specific implementation process, the SCEF exposes the query interface. The IN-CSE may query the capability information of the member device by accessing the query interface, to further learn whether the member device supports the MBMS.

Further, if the characteristic information includes the historical location information and the information indicating that the MBMS is supported, it is determined that the multicast type of the member device supporting the mobile network multicast communication manner is an MBMS.

In an implementable manner, the mobile network platform may query whether the resource of the member device stores the <node> resource to determine a manner of obtaining the information indicating that the member device supports the MBMS.

Step S603. When the characteristic information includes historical location information but does not include the information indicating that the MBMS is supported, the mobile network platform determines, according to the historical location information, base stations accessed within a preset time range by the member device supporting the mobile network multicast communication manner.

Further, if the characteristic information includes the historical location information of the member device but does not include the information indicating that the MBMS is supported, the IN-CSE determines that the member device does not support the MBMS. Therefore, the IN-CSE determines, using the historical location information of the member device, that the multicast type of the member device is a PDN or a CBS. The historical location information is used to determine at least two locations of the base stations accessed by the member device supporting the mobile network multicast communication manner. The IN-CSE determines a location change of the member device by obtaining the at least two locations of the base stations accessed by the member device in order to configure a multicast type for the member device according to the location change of the member device.

In a specific implementation process, in ONEM2M, the IN-CSE obtains the historical location information in three manners a network-based manner, a device-based manner, and a sharing-based manner. In a specific implementation process, the historical location information of the member device is stored in a <container> resource (data resource). The <container> resource is stored in the IN-CSE or a CSE of the member device. A manner of obtaining historical location information by each member device is configured by the member device itself. For a member device supporting a network-based positioning manner, when the member device registers with the IN-CSE, in addition to storing a resource of the member device in the IN-CSE, the member device may further periodically obtain historical location information of the member device from a base station in order to store the historical location information in the <container> resource in the IN-CSE. For member devices supporting the other two positioning manners, historical location information of the member devices is stored in CSEs of the member devices. For example, if historical location information of a member device is stored in a CSE in an MN (that is, an MN-CSE), the IN-CSE periodically sends a historical location information obtaining request to a <container> resource that stores the historical location information in the MN-CSE, to obtain the historical location information.

Step S604. The mobile network platform determines whether the base stations accessed within the preset time range by the member device supporting the mobile network multicast communication manner are a same base station.

Further, for the member device that does not support the MBMS, the IN-CSE determines mobility of the member device according to the historical location information in the characteristic information. Mobility indicates whether the base stations accessed within the preset time range by the member device are a same base station, that is, whether a specific location of the member device within the preset time range remains in a multicast range of a currently accessed base station. If yes, it indicates that the mobility of the member device is relatively low, the accessed base stations are always the same base station, and step S605 is performed. If no, it indicates that the mobility of the member device is relatively high, the accessed base stations are frequently changed, and step S606 is performed. Therefore, the IN-CSE needs to obtain a specific location of each member device supporting the mobile network multicast communication manner, then generates the historical location information according to each specific location, and determines the mobility of the member device according to the historical location information of the member device.

In an implementable manner, for a member device with insufficient positioning accuracy, the IN-CSE may deduce a specific location of the member device with insufficient positioning accuracy using a location relationship between an accurately positioned member device and the member device with insufficient positioning accuracy in order to obtain the historical location information. Location adjacency means that geographical locations of two or more member devices are within an area of a preset radius. If there are member devices adjacent in terms of locations, specific locations of the member devices adjacent in terms of locations may be determined.

Further, in this embodiment, it is assumed that, among the member device 6, the member device 7, the member device 8, the member device 9, and the member device 10, the member device 6, the member device 7, the member device 8, and the member device 10 are adjacent in terms of locations.

Further, for a member device using the network-based positioning manner, a specific location of the member device is a latitudinal and longitudinal location of a base station and a distance from the member device to the base station, and the specific location of the member device is stored in the base station. For a member device supporting the device-based positioning manner, a specific location of the member device is a latitudinal and longitudinal location returned by a GPS module carried in the member device, and the specific location of the member device is stored in the member device or a CSE of the member device. For a device supporting the sharing-based positioning manner, a manner of obtaining a specific location of the member device is learning of a device identifier (Device ID) of another member device closest to the member device and a distance from the member device to the other member device closest to the member device. In addition, the specific location of the member device is stored in the member device or a CSE of the member device. A manner of positioning the other member device closest to the member device is the network-based positioning manner or the device-based positioning manner.

In a specific implementation process, a method in which the IN-CSE determines, according to location information, whether member devices are adjacent is as follows. For the network-based positioning manner, if base station locations in location information of two or more member devices are the same, the IN-CSE determines that the two or more member devices are adjacent in terms of locations. For example, it is assumed that the member device 6 and the member device 7 use the network-based positioning manner, location information of the member device 6 is (N120E80, 500 meters (m)), and location information of the member device 7 is (N120E80, 800 m). Both the member device 6 and the member device 7 are within a coverage area of a base station N120E80, and the IN-CSE determines that the member device 6 and the member device 7 are adjacent in terms of locations. For the device-based positioning manner, if a latitudinal and longitudinal location of a member device is within a maximum coverage area of a base station, and the base station and a base station to which member devices whose locations are determined to be adjacent belong are a same base station, the member device and the member devices whose locations are determined to be adjacent are adjacent in terms of locations. For example, it is assumed that the member device 8 and the member device 9 use the device-based positioning manner, location information of the member device 8 is N120.01E80.01, a location information of the member device 9 is N125E90, and a radius of a maximum coverage area of the base station N120E80 is 800 m. A location of the member device 8 is within the maximum coverage area of the base station N120E80, and the IN-CSE determines that the member device 8 is adjacent to the member device 6 and the member device 7 in location. The member device 9 is outside the area. Therefore, the IN-CSE determines that the member device 9 is not adjacent to the member device 6 and the member device 7. For the sharing-based positioning manner, if a member device that shares a location with a specific member device is one of member devices whose locations are determined to be adjacent, the IN-CSE determines that the specific member device is adjacent to the member devices whose locations are already determined to be adjacent. For example, it is assumed that a location of the member device 10 is determined using the sharing-based positioning manner. If the member device 6 shares a location with the member device 10, the IN-CSE determines that the member device 10 is adjacent to the member device 6, the member device 7, and the member device 8 in terms of locations. After a distance between the member device 10 and the member device 6 is obtained, a specific location of the member device 10 is obtained using a specific location of the member device 6 and the distance between the member device 10 and the member device 6.

Step S605. When the base stations accessed within the preset time range by the member device supporting the mobile network multicast communication manner are the same base station, the mobile network platform determines that a multicast type of the member device supporting the mobile network multicast communication manner is a CBS.

Further, the IN-CSE determines a specific location of the member device within the preset time range, to obtain at least two locations of the base stations accessed by the member device, generates the historical location information of the member device, and determines whether the base stations accessed by the member device within the preset time range are the same in order to determine whether the mobility of the member device is high or low. If the mobility of the member device is relatively low, that is, the at least two locations of the accessed base stations are the same, it is determined that the multicast type of the member device is a CBS. In a specific implementation process, each <container> resource in ONEM2M may store records of multiple specific locations of the member device, and the record of each specific location has a location information creation timestamp. The IN-CSE may determine whether the member device has high mobility by comparing the records of the multiple specific locations. For example, it is assumed that the IN-CSE obtains historical location information records of the member devices 6, 7, 8, 9, and 10, and finds that the member device 6, the member device 8, and the member device 10 are in an immobility state in previous three to five location information records and are always located in a coverage area of a same base station, and that the member device 7 is separately located in coverage areas of different base stations in previous five location information records. The IN-CSE may determine that the member devices 6, 8, and 10 are adjacent in terms of locations and have relatively low mobility. Therefore, the IN-CSE may determine that a multicast type of the member devices is a CBS.

Step S606. When the base stations accessed within the preset time range by the member device supporting the mobile network multicast communication manner are different base stations, the mobile network platform determines that a multicast type of the member device supporting the mobile network multicast communication manner is a PDN.

Further, the IN-CSE determines that a multicast type of a remaining member device that does not support the MBMS and that has high mobility is a PDN. For example, the member device 7 is separately located in coverage areas of different base stations in the previous five location information records. Therefore, base stations accessed by the member device 7 within a time indicated by the historical location information are different. The IN-CSE may determine that a multicast type of the member device 7 is a PDN.

In an implementable manner, a multicast type of a member device that is not adjacent to another member device in terms of locations may also be determined to be a PDN. For example, the member device 9 is outside the maximum coverage area of the base station N120E80. Therefore, the IN-CSE determines that the member device 9 is not adjacent to the member device 6 and the member device 7. The IN-CSE may also determine that a multicast type of the member device 9 is a PDN.

Step S607. The mobile network platform creates, according to the multicast type of the member device supporting the mobile network multicast communication manner, a device sub-group of the device group for the member device supporting the mobile network multicast communication manner.

Further, the IN-CSE selects, according to the information indicating that the MBMS is supported in the characteristic information, the member device supporting the MBMS, and creates a device sub-group for the member device, that is, a device sub-group of the <group-3GPP>. The device sub-group is denoted as <group-MBMS>, and a multicast type of the device sub-group is an MBMS. For example, the <group-MBMS> created by the IN-CSE includes three member devices, the member device 1, the member device 2, and the member device 3.

Further, the CBS is defined as a service in which a message is simultaneously sent to member devices in a specified area. Therefore, the member devices need to be located in a specific area and have low mobility. After determining, according to the historical location information of the member device in the characteristic information, member devices that are adjacent in terms of locations or have low mobility, the IN-CSE may create a device sub-group for the member devices. The device sub-group is denoted as <group-CBS>, and a multicast type of the device sub-group is a CBS. For example, the <group-CBS> created by the IN-CSE includes four member devices, the member device 6, the member device 7, the member device 8, and the member device 10.

Further, the IN-CSE determines, according to the historical location information of the member device in the characteristic information, a member device that has high mobility or that is not adjacent to another member device, and creates a device sub-group for the member device, that is, a device sub-group of the <group-3GPP>. The device sub-group is denoted as <group-PDN>, and a multicast type of the device sub-group is a PDN. For example, the base stations accessed by the member device 7 within the time indicated by the historical location information are different, and the member device 9 is not adjacent to the member device 6 and the member device 7. Therefore, the <group-PDN> created by the IN-CSE includes two member devices, the member device 7 and the member device 9.

Step S608. The mobile network platform generates an identifier of a to-be-created external sub-group corresponding to the device sub-group of the device group.

Further, the IN-CSE generates an identifier of a to-be-created external sub-group corresponding to the MBMS device sub-group <group-MBMS> of the device group, for example, an external group ID of the <group-MBMS>. The IN-CSE then sends, to the SCEF, a request for creating an MBMS device sub-group of the external group. The request for creating a device sub-group includes the external group ID of the <group-MBMS> and the external device identifier (External ID) of the member device in the <group-MBMS> such that the SCEF creates the MBMS device sub-group of the external group according to the create request sent by the IN-CSE.

Further, the IN-CSE generates an identifier of a to-be-created external sub-group corresponding to the CBS device sub-group <group-CBS> of the device group, for example, an external group ID of the <group-CBS>. The IN-CSE then sends, to the SCEF, a request for creating a CBS device sub-group of the external group. The request for creating a device sub-group includes the external group ID of the <group-CBS> and the external device identifier (External ID) of the member device of the <group-CBS> such that the SCEF creates the CBS device sub-group of the external group according to the create request sent by the IN-CSE.

Further, the IN-CSE generates an identifier of a to-be-created external sub-group corresponding to the PDN device sub-group <group-PDN> of the device group, for example, an external group ID of the <group-PDN>. The IN-CSE then sends, to the SCEF, a request for creating a PDN device sub-group of the external group. The request for creating a device sub-group includes the external group ID of the <group-PDN> and the external device identifier (External ID) of the member device in the <group-PDN> such that the SCEF creates the PDN device sub-group of the external group according to the create request sent by the IN-CSE.

It may be learned from the above that, in this embodiment of the present disclosure, member devices having different functions may be divided according to different multicast types, to obtain different device sub-groups, thereby improving efficiency and a success rate during a subsequent multicast process.

Figure 10:
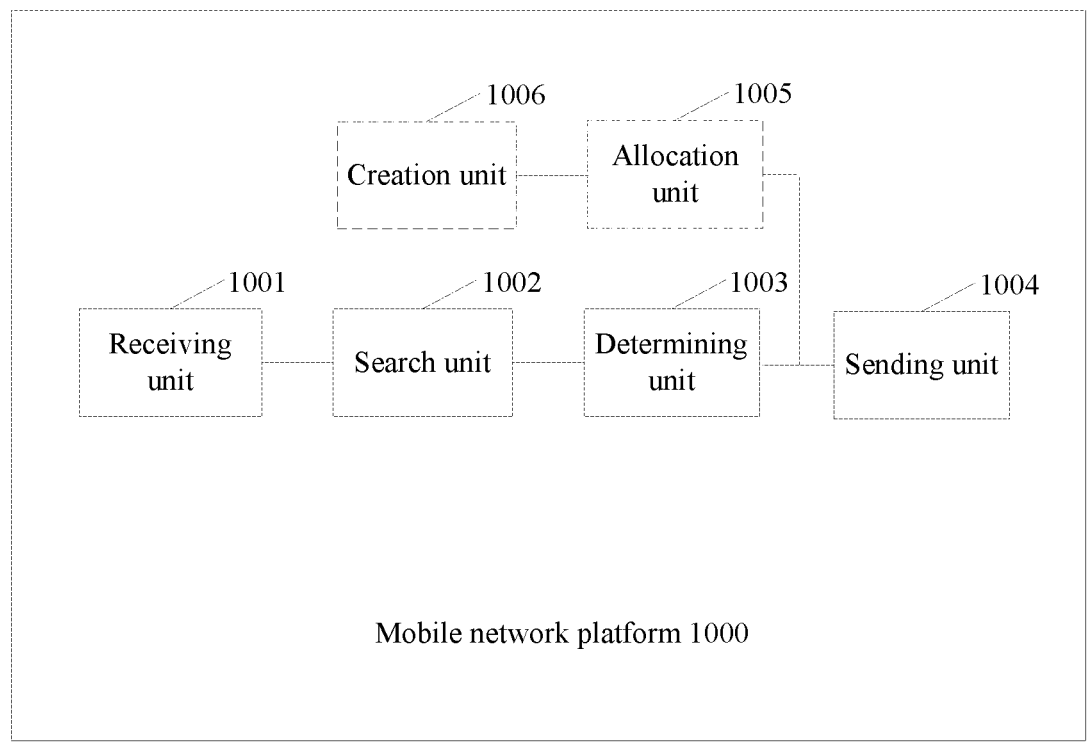
FIG. 10 is a schematic structural diagram of a mobile network platform according to a third embodiment of the present disclosure.

FIG. 10 is a schematic structural diagram of a mobile network platform 1000 according to a third embodiment of the present disclosure. The mobile network platform 1000 includes a receiving unit 1001, a search unit 1002, a determining unit 1003, and a sending unit 1004.

The receiving unit 1001 is configured to receive an access request for an M2M group, where the access request carries an M2M group identifier and request content. The search unit 1002 is configured to search for an identifier of a device group according to the M2M group identifier received by the receiving unit 1001, where a member device included in the device group is a member device supporting a mobile network multicast communication manner in a group indicated by the M2M group identifier. The determining unit 1003 is configured to determine an identifier of an external group corresponding to the device group found by the search unit 1002, where the external group is stored in a mobile network server, and a member device in the external group is the member device in the device group. The sending unit 1004 is configured to send a mobile network multicast request to the mobile network server, where the mobile network multicast request carries the identifier of the external group and the request content, the mobile network multicast request is used to instruct to send an access command to the member device in the external group in the mobile network multicast communication manner, and the access command carries the request content. The foregoing functional units are configured to perform steps S200, S201, and S204 to S206 in the embodiment of FIG. 6A and FIG. 6B, and steps related to steps S300 and S301 in the embodiment of FIG. 7A and FIG. 7B.

Optionally, as shown in FIG. 10, the mobile network platform 1000 further includes an allocation unit 1005.

The allocation unit 1005 is configured to allocate a response address to the member device in the device group, where the response address is used to receive a response that is sent by the member device in the device group in response to the access command.

The mobile network multicast request and the access command further carry the response address. For details about a related embodiment in which the allocation unit 1005 allocates the response address to the member device in the device group, refer to a related description of step S304 in the embodiment of FIG. 7A and FIG. 7B.

The receiving unit 1001 is further configured to receive response information that is sent for the request content by the member device in the device group to the response address. For details about a related embodiment in which the receiving unit 1001 receives the response information sent by the member device in the device group, refer to a related step of step S310 in the embodiment of FIG. 7A and FIG. 7B.

Optionally, the search unit 1002 is further configured to search for a device sub-group of the device group according to the identifier of the device group. For details about a related embodiment in which the search unit 1002 searches for the device sub-group of the device group, refer to a related step of step S300 in the embodiment of FIG. 7A and FIG. 7B.

The determining unit 1003 is further configured to determine an identifier of an external sub-group corresponding to the device sub-group. For details about a related embodiment in which the determining unit 1003 determines the identifier of the external sub-group corresponding to the device sub-group, refer to a related step of step S302 in the embodiment of FIG. 7A and FIG. 7B.

The mobile network multicast request further carries an identifier of the device sub-group.

Optionally, the determining unit 1003 is further configured to determine a multicast type of the device sub-group. For details about a related embodiment in which the determining unit 1003 determines the multicast type of the device sub-group, refer to a related step of step S303 in the embodiment of FIG. 7A and FIG. 7B.

The allocation unit 1005 is further configured to allocate the response address to a member device in the device sub-group according to the multicast type of the device sub-group. For details about a related embodiment in which the allocation unit 1005 allocates the response address to the member device in the device sub-group, refer to a related step of step S304 in the embodiment of FIG. 7A and FIG. 7B.

Optionally, as shown in FIG. 10, the multicast type of the device sub-group is a CBS. The mobile network platform 1000 further includes a creation unit 1006.

The creation unit 1006 is configured to create a request resource for the device sub-group, and allocate a request address to the request resource, where the request resource stores the request content. For details about a related embodiment in which the creation unit 1006 creates the request resource for the device sub-group, refer to a related step of step S305 in the embodiment of FIG. 7A and FIG. 7B.

The mobile network multicast request and the access command further carry the request address.

Optionally, the determining unit 1003 is further configured to determine a member device that is in the device group and that has not returned response information. For details about a related embodiment in which the determining unit 1003 determines a member device that is in the device group and that has not returned response information, refer to a related step of step S311 in the embodiment of FIG. 7A and FIG. 7B.

The creation unit 1006 is further configured to create a trigger device group whose multicast type is triggered multicast, where a member device in the trigger device group is the member device that is in the device group and that has not returned response information returned by the member device in the group device. For details about a related embodiment in which the creation unit 1006 creates the trigger device group whose multicast type is triggered multicast, refer to a related step of step S312 in the embodiment of FIG. 7A and FIG. 7B.

The sending unit 1004 is further configured to send a trigger external group create request to the mobile network server, where the trigger external group create request is used to instruct to create a trigger external group corresponding to the trigger device group, and the trigger external group create request includes an identifier of the trigger external group and an external device identifier of the member device in the trigger device group. For details about a related embodiment in which the sending unit 1004 sends the trigger external group create request to the mobile network server, refer to a related step of step S313 in the embodiment of FIG. 7A and FIG. 7B.

In this embodiment, the mobile network platform 1000 is represented in a form of functional units. A "unit" herein may be an ASIC, a circuit, a processor that executes one or more software or firmware programs and a memory, an integrated logical circuit, and/or another component that may provide the foregoing functions. In a simple embodiment, a person skilled in the art may FIG. out that the mobile network platform 1000 may use the form shown in FIG. 5. The receiving unit 1001, the search unit 1002, the determining unit 1003, the sending unit 1004, the allocation unit 1005, and the creation unit 1006 may be implemented using the processor and the memory in FIG. 5.

Figure 11:
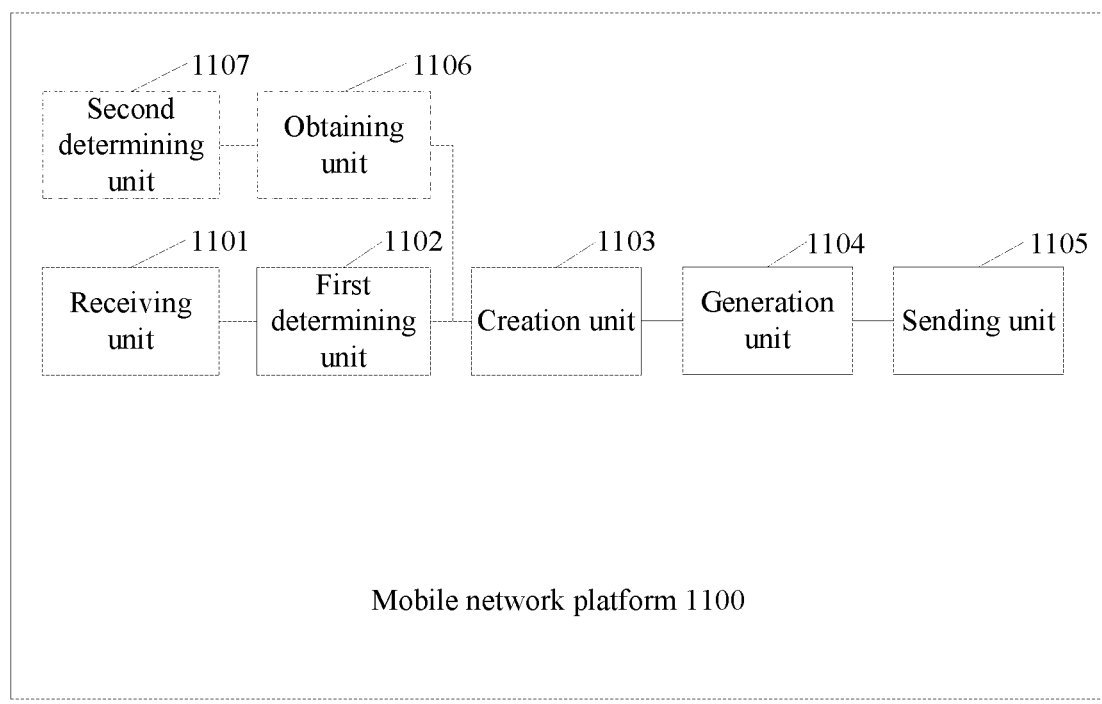
FIG. 11 is a schematic structural diagram of another mobile network platform according to a third embodiment of the present disclosure.

FIG. 11 is a schematic structural diagram of a mobile network platform 1100 according to a third embodiment of the present disclosure. The mobile network platform 1100 includes a receiving unit 1101, a first determining unit 1102, a creation unit 1103, a generation unit 1104, and a sending unit 1105.

The receiving unit 1101 is configured to receive a group create request, where the group create request carries an M2M group identifier and a device identifier of a member device in a to-be-created M2M group. The first determining unit 1102 is configured to determine, according to the device identifier of the member device that is received by the receiving unit 1101, a member device supporting a mobile network multicast communication manner. The creation unit 1103 is configured to create, according to the group create request received by the receiving unit 1101, an M2M group indicated by the M2M group identifier, where the M2M group includes a device group identifier, and the device group identifier includes information indicating that mobile network multicast is supported. The creation unit 1103 is further configured to create a device group for the member device that supports the mobile network multicast communication manner and that is determined by the determining unit. The generation unit 1104 is configured to generate, according to the information indicating that mobile network multicast is supported, an external group identifier of a to-be-created external group corresponding to the device group. The sending unit 1105 is configured to send an external group create request to a mobile network server, where the external group create request includes the external group identifier and an external device identifier of the member device supporting the mobile network multicast communication manner, and the external group create request is used to instruct to create an external group whose identifier is the external group identifier and that includes the external device identifier of the member device supporting the mobile network multicast communication manner. The foregoing functional units are configured to perform steps related to steps S501 and S503 to S507 in the embodiment of FIG. 8A and FIG. 8B.

Optionally, the first determining unit 1102 is further configured to obtain registration information of the member device according to the device identifier of the member device, and determine that a member device whose registration information includes the external device identifier is the member device supporting the mobile network multicast communication manner. For details about a related embodiment in which the first determining unit 1102 obtains the registration information of the member device, refer to steps related to steps S502 and S503 in the embodiment of FIG. 8A and FIG. 8B.

Optionally, as shown in FIG. 11, the mobile network platform 1100 further includes an obtaining unit 1106 and a second determining unit 1107.

The obtaining unit 1106 is configured to obtain characteristic information of the member device supporting the mobile network multicast communication manner, where the characteristic information includes historical location information of the member device supporting the mobile network multicast communication manner and/or information indicating that the member device supporting the mobile network multicast communication manner supports an MBMS. For details about a related embodiment in which the obtaining unit 1106 obtains the characteristic information of the member device supporting the mobile network multicast communication manner, refer to a related step of step S601 in the embodiment of FIG. 9.

The second determining unit 1107 is configured to determine, according to the historical location information of the member device supporting the mobile network multicast communication manner and/or the information indicating that the member device supporting the mobile network multicast communication manner supports the MBMS, a multicast type of the member device supporting the mobile network multicast communication manner.

The creation unit 1103 is further configured to create, according to the multicast type of the member device supporting the mobile network multicast communication manner, a device sub-group of the device group for the member device supporting the mobile network multicast communication manner. For details about a related embodiment in which the creation unit 1103 creates the device sub-group of the device group, refer to a related step of step S607 in the embodiment of FIG. 9.

The generation unit 1104 is further configured to generate, according to the information indicating that mobile network multicast is supported, an identifier of a to-be-created external sub-group corresponding to the device sub-group of the device group. For details about a related embodiment in which the generation unit 1104 generates the identifier of the to-be-created external sub-group, refer to a related step of step S608 in the embodiment of FIG. 9.

Optionally, the second determining unit 1107 is further configured to when the characteristic information includes the information indicating that the MBMS is supported, determine that the multicast type of the member device supporting the mobile network multicast communication manner is an MBMS, or when the characteristic information includes the historical location information but does not include the information indicating that the MBMS is supported, determine, according to the historical location information, base stations accessed within a preset time range by the member device supporting the mobile network multicast communication manner, determine whether the base stations accessed by the member device supporting the mobile network multicast communication manner are a same base station, and when the base stations accessed by the member device supporting the mobile network multicast communication manner are the same base stations, determine that the multicast type of the member device supporting the mobile network multicast communication manner is a CBS, or when the base stations accessed by the member device supporting the mobile network multicast communication manner are different base stations, determine that the multicast type of the member device supporting the mobile network multicast communication manner is a PDN. For details about a related embodiment in which the second determining unit 1107 further performs the foregoing steps, refer to related steps of steps S602 to S606 in the embodiment of FIG. 9.

In this embodiment, the mobile network platform 1100 is represented in a form of functional units. A "unit" herein may be an ASIC, a circuit, a processor that executes one or more software or firmware programs and a memory, an integrated logical circuit, and/or another component that may provide the foregoing functions. In a simple embodiment, a person skilled in the art may FIG. out that the mobile network platform 1100 may use the form shown in FIG. 5. The receiving unit 1101, the first determining unit 1102, the creation unit 1103, the generation unit 1104, the sending unit 1105, the obtaining unit 1106, and the second determining unit 1107 may also be implemented using the processor and the memory in FIG. 5.

Figure 12:
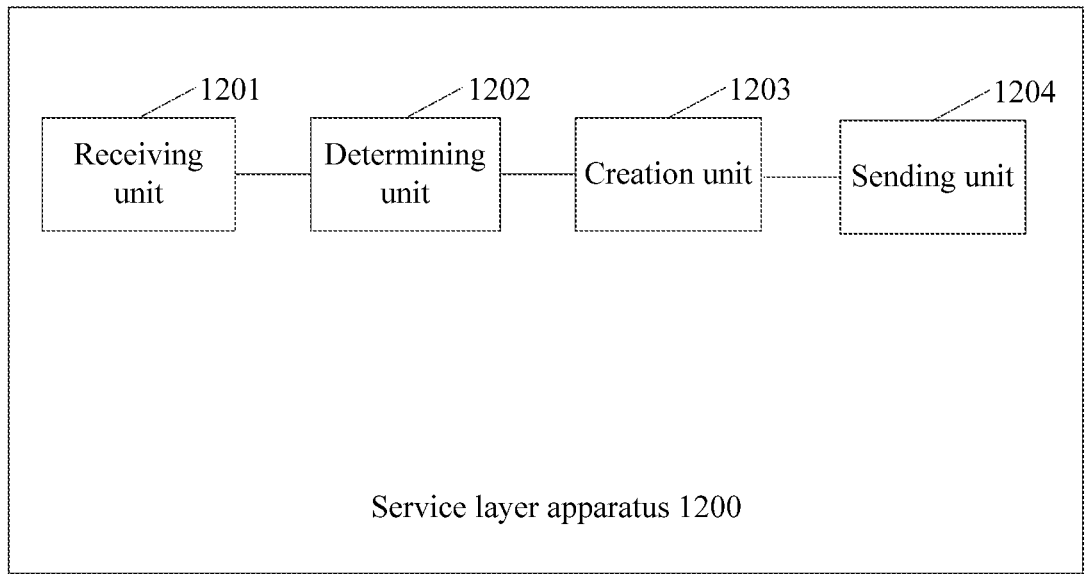
FIG. 12 is a schematic structural diagram of a service layer apparatus according to a fourth embodiment of the present disclosure.

FIG. 12 is a schematic structural diagram of a service layer apparatus 1200 according to a fourth embodiment of the present disclosure. The service layer apparatus 1200 shown in FIG. 12 includes a receiving unit 1201, a determining unit 1202, a creation unit 1203, and a sending unit 1204.

The receiving unit 1201 is configured to receive a group create request, where the group create request carries a M2M group identifier and a device identifier of a member device in a to-be-created M2M group. The determining unit 1202 is configured to determine, according to the device identifier of the member device, a member device supporting a mobile network multicast communication manner. The creation unit 1203 is configured to create, according to the group create request, an M2M group indicated by the M2M group identifier, where the M2M group includes a device group identifier, and the device group identifier includes information indicating that mobile network multicast is supported. The sending unit 1204 is configured to send a device group create request to a mobile network platform, where the device group create request carries the device group identifier and information about the determined member device supporting the mobile network multicast communication manner, and the information indicating that mobile network multicast is supported is used to instruct to generate an external group identifier and create, in a mobile network server, an external group that includes the information about the member device supporting the mobile network multicast communication manner. The foregoing functional units are configured to perform steps related to steps S501 to S505 in the embodiment of FIG. 8A and FIG. 8B.

Figure 13:
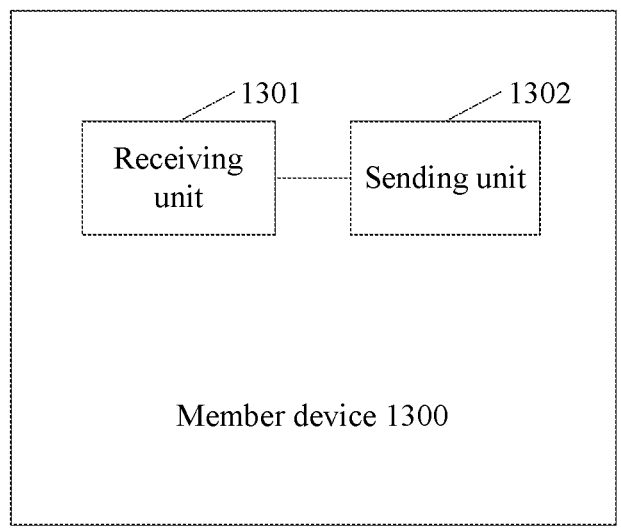
FIG. 13 is a schematic structural diagram of a member device according to a fifth embodiment of the present disclosure.

FIG. 13 is a schematic structural diagram of a member device 1300 according to a fifth embodiment of the present disclosure. The member device 1300 shown in FIG. 13 includes a receiving unit 1301 and a sending unit 1302.

The receiving unit 1301 is configured to receive an access command that is sent by a mobile network server in a mobile network multicast communication manner, where the access command carries request content and a response address that is allocated to a member device by a mobile network platform, and the response address includes an identifier of the mobile network platform. The sending unit 1302 is configured to send, according to the response address, response information for the request content to the mobile network platform indicated by the identifier of the mobile network platform. The foregoing functional units are configured to perform steps related to steps S307 to S310 in the embodiment of FIG. 7A and FIG. 7B.

An embodiment of the present disclosure further provides a computer storage medium configured to store a computer software instruction used by the mobile network platforms shown in FIG. 10 and FIG. 11, where the computer software instruction includes a program designed to implement the foregoing method embodiments. Group multicast may be implemented by executing the stored program.

An embodiment of the present disclosure further provides a computer storage medium configured to store a computer software instruction used by the service layer apparatus shown in FIG. 12, where the computer software instruction includes a program designed to implement the foregoing method embodiments. Group multicast may be implemented by executing the stored program.

An embodiment of the present disclosure further provides a computer storage medium configured to store a computer software instruction used by the member device shown in FIG. 13, where the computer software instruction includes a program designed to implement the foregoing method embodiments. Group multicast may be implemented by executing the stored program.

Although the present disclosure is described with reference to the embodiments, in a process of implementing the present disclosure that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as using the Internet or another wired or wireless telecommunications system.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although the present disclosure is described with reference to specific features and the embodiments thereof, obviously, various modifications and combinations may be made to them without departing from the scope of the present disclosure. Correspondingly, the specification and accompanying drawings are merely examples of the present disclosure defined by the accompanying claims, and is considered as any of or all modifications, variations, combinations or equivalents that cover the scope of the present disclosure. Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A group multicast method, comprising:
receiving an access request for a first machine-to-machine communications (M2M) group, wherein the access request carries an M2M group identifier and request content;
searching for an identifier of a second M2M group according to the M2M group identifier, wherein a member device comprised in the second M2M group supports a mobile network multicast communication manner, and wherein the member device is included in the first M2M group;
determining an identifier of an external group of a Third Generation Partnership Project (3GPP) network corresponding to the second M2M group, wherein information of the external group is stored in a mobile network server in the 3GPP network, and wherein a member device in the external group is the member device in the second M2M group;
sending a mobile network multicast request to the mobile network server in the 3GPP network, wherein the mobile network multicast request carries the identifier of the external group and the request content, wherein the mobile network multicast request instructs sending an access command to the member device in the external group in the mobile network multicast communication manner, and wherein the access command carries the request content;
receiving response information from the member device in the second M2M group;
determining a member device in the second M2M group that has not returned the response information;
creating a trigger second M2M group whose multicast type is triggered multicast, wherein a member device in the trigger second M2M group comprises the member device in the second M2M group that has not returned the response information; and
sending a trigger external group create request to the mobile network server, wherein the trigger external group create request instructs the mobile network server to create a trigger external group corresponding to the trigger second M2M group, and wherein the trigger external group create request comprises an identifier of the trigger external group and an external device identifier of the member device in the trigger second M2M group.

2. The group multicast method of claim 1, further comprising allocating a response address to the member device in the second M2M group before sending the mobile network multicast request to the mobile network server, wherein the response address is used to receive a response from the member device in the second M2M group in response to the access command, wherein the mobile network multicast request and the access command further carry the response address, and wherein receiving the response information from the member device in the second M2M group comprises receiving response information sent for the request content by the member device in the second M2M group to the response address.

3. The group multicast method of claim 2, wherein before determining the identifier of the external group corresponding to the second M2M group, the group multicast method further comprises:
   searching for a device sub-group of the second M2M group according to the identifier of the second M2M group; and
   determining the identifier of the external group corresponding to the second M2M group by determining an identifier of an external sub-group corresponding to the device sub-group, wherein the mobile network multicast request further carries an identifier of the device sub-group.

4. The group multicast method of claim 3, wherein after searching for the device sub-group of the second M2M group, the group multicast method further comprises:
   determining a multicast type of the device sub-group; and
   allocating the response address to the member device in the second M2M group by allocating the response address to a member device in the device sub-group according to the multicast type of the device sub-group.

5. The group multicast method of claim 4, wherein the multicast type of the device sub-group comprises a cell broadcast service (CBS), wherein the group multicast method further comprises:
   creating a request resource for the device sub-group; and
   allocating a request address to the request resource, wherein the request resource stores the request content, and wherein the mobile network multicast request and the access command further carry the request address.

6. The group multicast method of claim 1, wherein the group multicast method is implemented in an intelligent transportation field.

7. The group multicast method of claim 1, wherein the group multicast method is implemented in an agricultural irrigation field.

8. The group multicast method of claim 1, wherein the group multicast method is implemented in a smart household field.

9. The group multicast method of claim 1, wherein the group multicast method is implemented in a power grid field.

10. The group multicast method of claim 1, wherein the group multicast method is implemented in a meter reading field.

11. The group multicast method of claim 1, wherein the group multicast method is implemented in an Internet of Things field.

12. A mobile network platform, comprising:
   a receiver configured to:
      receive an access request for a first machine-to-machine communications (M2M) group, wherein the access request carries an M2M group identifier and request content; and
      receive response information from a member device in a second M2M group;
   a processor coupled to the receiver and configured to:
      search for an identifier of the second M2M group according to the M2M group identifier, wherein a member device comprised in the second M2M group supports a mobile network multicast communication manner, and wherein the member device is included in the first M2M group;
      determine an identifier of an external group of a Third Generation Partnership Project (3GPP) network corresponding to the second M2M group, wherein information of the external group is stored in a mobile network server in the 3GPP network, and wherein a member device in the external group is the member device in the second M2M group;
      determine a member device in the second M2M group that has not returned the response information; and
      create a trigger second M2M group whose multicast type is triggered multicast, wherein a member device in the trigger second M2M group comprises the member device in the second M2M group that has not returned the response information; and
   a transmitter coupled to the receiver and the processor and configured to:
      send a mobile network multicast request to the mobile network server in the 3GPP network, wherein the mobile network multicast request carries the identifier of the external group and the request content, wherein the mobile network multicast request instructs the mobile network server to send an access command to the member device in the external group in the mobile network multicast communication manner, and wherein the access command carries the request content; and
      send a trigger external group create request to the mobile network server, wherein the trigger external group create request instructs the mobile network server to create a trigger external group corresponding to the trigger second M2M group, and wherein the trigger external group create request comprises an identifier of the trigger external group and an external device identifier of the member device in the trigger second M2M group.

13. The mobile network platform of claim 12, wherein before the transmitter sends the mobile network multicast request to the mobile network server, the processor is further configured to allocate a response address to the member device in the second M2M group, wherein the response address is used receive a response from the member device in the second M2M group in response to the access command, wherein the mobile network multicast request and the access command further carry the response address, and wherein the receiver is further configured to receive response information sent for the request content by the member device in the second M2M group to the response address.

14. The mobile network platform of claim 13, wherein before determining the identifier of the external group corresponding to the second M2M group, the processor is further configured to:

search for a device sub-group of the second M2M group according to the identifier of the second M2M group; and determine an identifier of an external sub-group corresponding to the device sub-group when determining the identifier of the external group corresponding to the second M2M group, wherein the mobile network multicast request further carries an identifier of the device sub-group.

15. The mobile network platform of claim 14, wherein after searching for the device sub-group of the second M2M group, the processor is further configured to:

determine a multicast type of the device sub-group; and allocate the response address to a member device in the device sub-group according to the multicast type of the device sub-group when allocating the response address to the member device in the second M2M group.

16. The mobile network platform of claim 15, wherein the multicast type of the device sub-group comprises a cell broadcast service (CBS), and wherein the processor is further configured to:

create a request resource for the device sub-group; and allocate a request address to the request resource, wherein the request resource stores the request content, and wherein the mobile network multicast request and the access command further carry the request address.

17. A group multicast method, comprising:

receiving an access request for a first machine-to-machine communications (M2M) group, wherein the access request carries an M2M group identifier and request content;

searching for an identifier of a second M2M group according to the M2M group identifier, wherein a member device comprised in the second M2M group supports a mobile network multicast communication manner, and the member device is included in the first M2M group;

determining an identifier of an external group of a Third Generation Partnership Project (3GPP) network corresponding to the second M2M group, wherein information of the external group is stored in a mobile network server in the 3GPP network, and wherein a member device in the external group is the member device in the second M2M group;

sending a mobile network multicast request to the mobile network server in the 3GPP network, wherein the mobile network multicast request carries the identifier of the external group and the request content, wherein the mobile network multicast request instructs sending an access command to the member device in the external group in the mobile network multicast communication manner, and wherein the access command carries the request content;

determining a member device in the second M2M group that has not returned response information; and creating a trigger second M2M group whose multicast type is triggered multicast, wherein a member device in the trigger second M2M group comprises the member device in the second M2M group that has not returned the response information.

18. The group multicast method of claim 17, further comprising sending a trigger external group create request to the mobile network server.

19. The group multicast method of claim 18, wherein the trigger external group create request instructs the mobile network server to create a trigger external group corresponding to the trigger second M2M group.

20. The group multicast method of claim 19, wherein the trigger external group create request comprises an identifier of the trigger external group and an external device identifier of the member device in the trigger second M2M group.

* * * * *

UNITED STATES PATENT AND TRADEMARK OFFICE
CERTIFICATE OF CORRECTION

PATENT NO. : 10,841,751 B2
APPLICATION NO. : 16/010047
DATED : November 17, 2020
INVENTOR(S) : Jiaxin Yin et al.

Page 1 of 1

It is certified that error appears in the above-identified patent and that said Letters Patent is hereby corrected as shown below:

On the Title Page

Item (65) Related U.S. Application Data: "PCT/CM2016/109746" should read "PCT/CN2016/109746".

Signed and Sealed this
Fifth Day of January, 2021

Andrei Iancu
*Director of the United States Patent and Trademark Office*